United States Patent [19]
Chan et al.

[11] Patent Number: 5,768,481
[45] Date of Patent: Jun. 16, 1998

[54] METHOD AND APPARATUS FOR COMPRESSION OF DIGITIZED IMAGE DATA USING A DYNAMIC BAND RECOMPRESSION SCHEME

[75] Inventors: Allen M. Chan; Kok S. Chen, both of Sunnyvale, Calif.

[73] Assignee: Apple Computer, Inc., Cupertino, Calif.

[21] Appl. No.: 463,783

[22] Filed: Jun. 5, 1995

[51] Int. Cl.$^6$ .................. G06F 15/00; H04N 1/415; H04N 1/46; H04N 11/02
[52] U.S. Cl. .................. 395/102; 358/261.2; 358/261.3; 358/426; 358/430; 358/432; 358/433; 358/448; 358/453; 358/530; 358/538; 382/232; 382/233; 348/398; 348/420
[58] Field of Search ........................ 358/530, 448, 358/453, 538, 539, 426, 261.1, 462, 430, 432, 433, 261.3, 443, 261.4; 348/397, 398, 399, 400, 401, 402, 390, 391, 372, 420, 421, 469; 382/232, 239, 244, 243, 233, 236; 395/102

[56] References Cited

U.S. PATENT DOCUMENTS

| | | | |
|---|---|---|---|
| 4,797,739 | 1/1989 | Tanaka | 358/433 |
| 4,903,317 | 2/1990 | Nishihara et al. | 382/244 |
| 4,918,541 | 4/1990 | Ishida et al. | 358/438 |
| 5,003,299 | 3/1991 | Batson et al. | 340/703 |
| 5,068,644 | 11/1991 | Batson et al. | 340/701 |
| 5,144,688 | 9/1992 | Bovir et al. | 382/243 |
| 5,189,521 | 2/1993 | Ohtsubo et al. | 358/296 |
| 5,237,397 | 8/1993 | Mighdoli et al. | 358/433 |
| 5,291,286 | 3/1994 | Murakami et al. | 348/469 |
| 5,408,328 | 4/1995 | Boliek et al. | 358/433 |
| 5,408,542 | 4/1995 | Callahan | 382/244 |
| 5,455,680 | 10/1995 | Shin | 358/433 |
| 5,576,845 | 11/1996 | Komatsu | 358/433 |
| 5,588,069 | 12/1996 | Katayama et al. | 382/239 |

OTHER PUBLICATIONS

Data Compression Techniques and Applications, Thomas J. Lynch, Ph.D, Van Nostrand Reinhold Company, New York, 1985, Table of Contents, plus Chapter 5, Transform Coding, pp. 68–81.

Tilings and Patterns–An Introduction, Branko Grunbaum et al.

Inside Macintosh™, vol. I, II, and III, Addison–Wesley Publishing Company, Inc., 1985, 3 pages, including a page labelled 1–470 Toolbox Utility Routines.

Graphics File Formats, David C. Kay et al, Windcrest®/ McGraw–Hill, 1992, Table of Contents, plus Chapter 15, JPEG, pp. 141–148.

Graphics Gems II, "11.4 Fast Anamorphic Image Scaling", by Dale A. Schumacher, 1991, Academic Press Inc., ESEN 0–12–064480–0, Title Page and pp. 78–79.

PostScript Language Reference Manual, Second Edition, by Adobe Systems Incorporated, 1990, Title Page, and pp. 305–307.

*Primary Examiner*—Edward L. Coles, Sr.
*Assistant Examiner*—Mark Wallerson
*Attorney, Agent, or Firm*—Burns, Doane, Swecker & Mathis, L.L.P.

[57] ABSTRACT

The present invention is directed to systems and methods for encoding (for example, compressing) image data while at the same time, improving both the compression ratio and the perceptibility of the decoded (for example, decompressed) image using a dynamic band recompression scheme. In accordance with exemplary embodiments, portions of a compressed image are decompressed upon occurrence of a predetermined condition prior to compression of an entire frame of image data, and then recompressed with subsequent portions of the original image. Exemplary embodiments achieve enhanced fidelity in a decompressed image even when the image data is compressed without segregation into its scanned and non-scanned components.

18 Claims, 14 Drawing Sheets

| S | Y | M | C | K |

| S | Y | M | C |

| S | K |

1/150" (4 BY 4 PIXELS) @ 600 DPI RESOLUTION

| S | C0 | C1 | 16 BIT MASK |

| S | C0 | C1 | MARK LOOKUP INDEX |

| 15 | 14 | 13 | 12 | 11 | 10 | 9 | 8 | 7 | 6 | 5 | 4 | 3 | 2 | 1 | 0 |

| 15 | 14 | 11 | 10 |
| 13 | 12 | 9 | 8 |
| 7 | 6 | 3 | 2 |
| 5 | 4 | 1 | 0 |

| 31 | 24 23 | 16 15 | 8 7 | 0 |
|---|---|---|---|---|
| K | C | M | Y |

FIG. 4a

| 31 | 24 | 23 | 20 | 19 | 16 | 15 | 12 | 11 | 8 | 7 | 4 | 3 | 0 |
|---|---|---|---|---|---|---|---|---|---|---|---|---|---|
| K7K6K5K4K3K2K1 K0 | | C7C6C5 C4 | | | | M7M6M5 M4 | | | | Y7Y6Y5 Y4 | | | |

FIG. 4b

METHOD AND APPARATUS FOR
COMPRESSION OF DIGITIZED IMAGE
DATA USING A DYNAMIC BAND
RECOMPRESSION SCHEME

BACKGROUND OF THE INVENTION

1. Field of the Invention

The present invention relates generally to compression and decompression of digitized image data used, for example, to represent text, graphics and scanned images. More particularly, the invention relates to encoding variant color image data during compression of the image data, while retaining enhanced fidelity of decompressed images.

2. State of the Art

Digitized images displayed on scanners, monitors and printers are typically quantized on a pixel-by-pixel basis and stored in memory as pixel maps, more commonly referred to as pixmaps. A pixmap is a two-dimensional array of picture elements mapped to locations of the digitized image.

To provide sufficient color range and fidelity, each pixel is typically stored in memory as a set of color coordinates which define the pixel's color location in a given color space. For example, a pixel is typically represented by its red, green and blue color component values, or by its cyan, magenta and yellow color component values. The fidelity of the color reproduction is a function of the accuracy with which each color component is represented.

Due to the increased volume of data required to represent color images, effort has been directed to compression of color data pixmaps. Because it is not practical or possible to provide a digital representation for all possible colors, the data used to represent each color component is necessarily compromised. Color fidelity is further compromised when the data used to represent the various colors of an image is compressed.

Early attempts at image compression relied upon techniques deemed suitable for non-scanned image data (such as text and synthetic graphics), assuming that they would work equally well for scanned images. One such technique was run-length coding, as described in "Inside Macintosh, Volumes I, II, III", Addison-Wesley, Reading, Mass., 1985, ISBN 0-201-17737-4. Run-length encoding exploits the repetition of pixel values in long data "runs" by transmitting a single pixel value together with the length of the "run". Such techniques are relatively simple and effective for data used to represent text and line-art. However, run-length encoding techniques have proven less suitable for scanned images (such as scanned photographs or video images) where numerous colors typically exist.

More advanced compression techniques are directed to maintaining color as close to full fidelity as possible. However, these techniques are theoretically "lossy" in that information content (such as edge acuity of text included in the image) is not maintained.

Known efforts for compressing image data have addressed this drawback of compression techniques by segregating the data of a pixmap into two components: (1) scanned image components and (2) all remaining components (such as text and synthetic graphics). Once segregated, the scanned image components are passed through compression techniques better suited for compressing scanned images (such as the JPEG industry standard compression techniques). The remaining components of the image data are separately passed to compression techniques better suited for objects that require good edge acuity (such as run length encoding).

However, this technique of segregating image data components suffers significant drawbacks. One such drawback is that the function of segregating presents problems. Objects included within the image data have to be tagged as scanned image data or as non-scanned image data before being placed into the pixmap. Otherwise, there is no way of determining the type of object to which a pixel belongs. Additional complexities result when overlapping areas of scanned images and non-scanned images are included within the image data.

Accordingly, it would be desirable to provide a technique for compressing image data without requiring the complexities associated with segregating the image data into its scanned and non-scanned components. It would further be desirable to reduce any perceptible degradation of the decompressed image, regardless of whether the image data includes scanned images, non-scanned images or any combination thereof. For variable color images (that is, images which include two or more different colors or grey scale levels), it would be desirable to accurately encode the colors in a manner suitable for achieving high compression ratios without sacrificing color fidelity as perceived by the unaided eye when the compressed color variant image data is decompressed.

For color images, high compression ratios can only be achieved if the vast number of colors (including grey scale values) extant in the world are represented with a reduced color palette such that processing time can be reduced. However, no known techniques have successfully achieved such a reduction without a substantial sacrifice of color fidelity. This lack of color fidelity is aggravated when attempts are made to compress both scanned and unscanned images collectively, without the benefit of segregation; that is, compressed digital data formats which are chosen to preserve the edge acuity of non-scanned images thereby reduce the number of data bits available to preserve color fidelity unless the width of the compressed data word used to represent each pixel and/or overall memory size is substantially increased. This lack of color fidelity is further aggravated when real-time compression of an incoming data stream is required. In the past, constraints associated with real-time compression have required the use of a severely limited color palette to reduce processing time.

Thus, it would be desirable to provide a technique for compressing image data which does not impose large memory requirements and which does not sacrifice color fidelity when the data is decompressed, even when: (1) scanned and unscanned image data is compressed collectively; and (2) the image data is compressed in real-time.

SUMMARY OF THE INVENTION

The present invention is directed to systems and methods for encoding (for example, compressing) image data while at the same time, improving both the compression ratio and the perceptibility of the decoded (for example, decompressed) image using a dynamic band recompression scheme. In accordance with exemplary embodiments, portions of a compressed image are decompressed upon detected occurrence of a predetermined condition prior to compression of an entire frame of image data, and then recompressed with subsequent portions of the original image.

More particularly, exemplary embodiments separate a frame of image data into plural bands which are individually compressed. By compressing only a portion of the original frame of image data at any given time, memory for storing the entire frame of raw image data is unnecessary; rather, as each band of the image data is received, it can be compressed, after which the next band of the image data can be received and processed. Thus, the entire frame of image data is only stored in its compressed form and memory requirements can be substantially reduced. By using a dynamic band recompression scheme, optimum color fidelity of the subsequently decompressed image can be achieved with minimized memory requirements.

Generally speaking, exemplary embodiments of the present invention relate to a method and apparatus for compressing a frame of image data by: processing a portion of the frame of image data, encoding image data included in said portion of the frame of image data; and dynamically decoding portions of said encoded image data, prior to encoding the entire frame of image data, in response to a predetermined condition. For example, the predetermined condition used to trigger a decompression of any portions of the frame of image data which were previously compressed can be the occurrence of an overflow condition in a look-up table dynamically encoded during the compression. One such look-up table can be a look-up table used to store a color palette associated with colors for at least some of the pixels included in the frame of image data. By using dynamic band recompression in accordance with exemplary embodiments of the present invention, improved perceptibility of decompressed images is achieved regardless of whether scanned images, non-scanned images or any combination thereof were collectively compressed. Exemplary embodiments achieve improved perceptibility regardless of whether the original images are monochrome (having varying grey scale values) or include multiple colors. In addition, improved perceptibility is realized in a manner which permits image data including scanned and/or unscanned images to be compressed in real-time.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein:

FIGS. 4a–4b illustrate exemplary representations of image data and partially prequantized image data, respectively;

DETAILED DESCRIPTION OF THE PREFERRED EMBODIMENTS

1. System Overview

Figure 1:
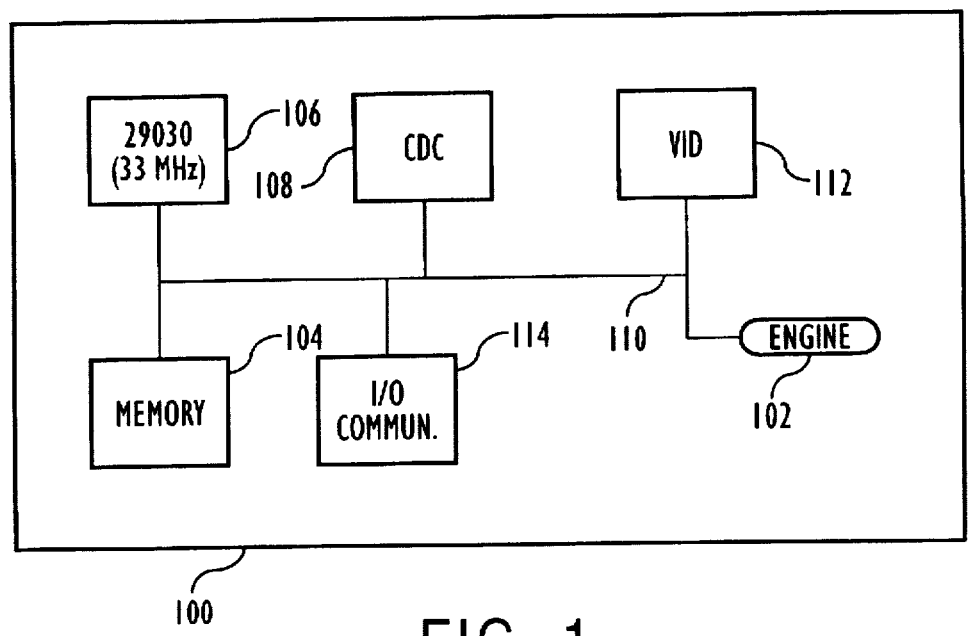
FIG. 1 illustrates a printing control system which incorporates an exemplary embodiment of the present invention.

FIG. 1 illustrates an exemplary embodiment of an apparatus for processing a frame of image data such that the image data can be encoded for compression in accordance with an exemplary embodiment of the present invention. As referenced herein, image data corresponds to data obtained from an image that can be quantized (for example, digitized) for storage in a pixmap and subsequently compressed. Image data that is compressed in accordance with exemplary embodiments of the present invention can be digitized image data captured through any instrumentation, such as a video camera.

Image data as referenced herein encompasses scanned data as well as non-scanned data. Non-scanned data typically includes character glyphs and graphical data, such as hand-sketched or computer generated graphics. Those skilled in the art will appreciate that image data processed in accordance with exemplary embodiments of the present invention can also include any combination of scanned and non-scanned data.

As referenced herein, a frame of quantized image data corresponds to a preselected group of digitized data, such as the data associated with a display screen or a printed sheet. Typically, such image data is obtained from or reproduced using a scanner device, a monitor or a printing device. However, those skilled in the art will appreciate that the image data can merely be processed for transfer between two locations (for example, between two computers).

It will be appreciated that exemplary embodiments of the present invention can be applied to the processing of image data for reproduction using any visual medium. In the case of printing, the image will typically be reproduced on conventional size paper such as letter size, A4, B5 and legal size. However, those skilled in the art will appreciate that the present invention can be applied to images of any size which are reproduced in any format.

To facilitate an understanding of the present invention, FIG. 1 illustrates a printing system 100 which incorporates features of the present invention. The FIG. 1 printing system includes a color laser engine 102, such as any commercially available color laser marking engine. For purposes of the following discussion, the term "color" includes use of multiple colors (such as red, green and blue), as well as gray-scale printing using varying shades of gray.

Referring to FIG. 1, an incoming frame of data is directed by a processor, represented as printing system controller 106 having associated memory 104, to a compression/decompression coprocessor 108 (CDC). In the exemplary embodiment of FIG. 1, the printing system controller 106 partitions a frame of quantized image data into partitioned blocks. The compressor/decompression coprocessor 108 constitutes an exemplary apparatus for processing a frame of quantized image data by compressing the image data within each of the partitioned blocks. More particularly, the coprocessor 108 includes a processor for prequantizing image data by selectively eliminating bits used to represent at least one color component of each pixel for the frame of image data and for encoding the remaining bits of the prequantized data to compress prequantized data.

Because the amount of memory typically required to store an entire frame of image data within the printing system 100 is impractical, an entire frame of uncompressed data is not stored within the printing system 100 at any given time. Rather, a frame buffer stores the incoming frame of image data in portions (for example, on a row-by-row basis), for sequential processing. As each portion of the frame is compressed, another portion is fetched by the printing system controller. As a result, an entire frame of image data is only stored in the print system 100 after it has been compressed in a manner to be described in accordance with exemplary embodiments of the present invention.

In accordance with exemplary embodiments, the printing system controller 106 can be a reduced instruction set computer (RISC) such as the 33 Megahertz 29030 processor available from Advanced Micro Devices. The printing system controller 106 pre-processes an incoming frame of image data to: (a) scale the image data to a desired resolution; (b) partition the image data into partitioned blocks of a predetermined size; (c) resample the image data to ensure its alignment with the partitions; (d) filter the image data to ensure that each partitioned block contains no more than a predetermined number of color variations; and (e) create a side information buffer with information acquired during the pre-processing that can be used to enhance performance during subsequent processing.

In accordance with exemplary embodiments, the compressing of image data includes an initial step of classifying each partitioned block based on whether the partitioned block is determined to be color variant or determined to be color invariant. This step of classifying can be implemented by comparing the pixels within a given partitioned block to one another during the pre-processing to determine whether a given partitioned block is color variant or color invariant. Once having classified each partitioned block as being either color variant or color invariant, the compression/decompression co-processor 108 can be used to further compress the data. Those skilled in the art will appreciate that the steps of classifying each partitioned block as being either color variant or color invariant can be performed by the printing system controller 106 as part of the pre-processing (for example, classification information can be stored in the side information buffer), or can be performed by the compression/decompression coprocessor 108.

In accordance with exemplary embodiments, the compression/decompression coprocessor compresses the image data included in the partitioned blocks of pixels to substantially reduce the memory requirements required to store a frame of image data. The compression/decompression coprocessor compresses the image data within each partitioned block by representing a block which is determined to include color variations with less color fidelity than a block which is determined not to include color variations. Further, the compression/decompression coprocessor uses memory (that is, any specified memory) for storing the compressed image data as a representation of the original image. Alternately, the compressed image data can be immediately transmitted from the printing system 100 as it is compressed, for external buffering and decompression.

In an exemplary embodiment, a decompression engine is included within the compression/decompression coprocessor for use during the compression process. Recall that an entire frame of uncompressed image data is not stored in the printing system 100 at any given time; rather the entire frame is stored and compressed in sequentially processed portions. The decompression engine is provided within the compression/decompression coprocessor to accommodate a situation where newly received image data is to be superimposed on portions of the frame which have been earlier compressed. In this situation, the earlier compressed portion of the frame is retrieved, decompressed and returned to the frame buffer. The decompressed data which has been returned to the frame buffer is then overlaid with the newly received image data, after which the superimposed image data is recompressed.

The compression/decompression coprocessor 108 can, for example, be formed as a monolithic application specific integrated circuit (that is, an ASIC chip). However, those skilled in the art will appreciate that the processing implemented by the coprocessor 108 can be performed by the same processor used to implement the functions of the controller 106. Alternately, the compression/decompression functions can be implemented with any or all other functions of the FIG. 1 system in a single ASIC using a single processor. Further, those skilled in the art will appreciate that the compression and decompression functions of the FIG. 1 system can be implemented in software or hardware. In the exemplary FIG. 1 embodiment, the compression functions are implemented using software and hardware, while the decompression functions are primarily implemented in hardware.

Once a frame of image data has been compressed and stored in the compression/decompression coprocessor, it can subsequently be transferred to the printer engine 102 via a system bus 110 and a video interface device (VID) 112. The video interface device can, for example, be formed as a separate ASIC chip having a decompression processor to support decompression and half-toning. Alternately, a single processor can be used to implement the functions of the controller 106, the coprocessor 108 and video interface device 112. The video interface device provides high quality reproduction of the original image from its compressed format.

The FIG. 1 system further includes an input/output (I/O) communications device 114. The input/output communications device can include, for example, built-in networking support as well as parallel/serial I/O ports. Further, the I/O communications device can include additional memory as well as memory expansion ports. Any conventional I/O communications features can be used in accordance with the present invention, such that the I/O communications device need not be described in detail.

Before describing the compression/decompression operation in detail, the data format of uncompressed image data will be described. Afterward, pre-processing of the uncompressed image data will be discussed. Further, exemplary data formats of compressed image data will be discussed.

2. Uncompressed Image Data Format

A frame of image data associated with an original image has a given width and length. The number of pixels (m) in a given row of a scan line across the width of the frame is set in a horizontal total pixel count register. In accordance with exemplary embodiments of the present invention, the value set in the horizontal total pixel count register is divisible by 4.

In a vertical direction, along the length of the frame (and in the case of printing, along the paper motion direction), the number of pixels is set in a vertical total pixel count register. Again, the value set in the vertical total pixel count register of exemplary embodiments is divisible by 4.

In accordance with exemplary embodiments, the user can also set the number of bits used to represent each color component for a given pixel to 1, 4 or 8 bits. For example, if the user selects 4 color components to define a pixel, with each color component being represented by 8 bits, then each pixel would be represented as a 32-bit word (that is, 8 bits for each of the cyan, magenta, yellow and black color components).

In accordance with exemplary embodiments, the color of a pixel can be represented by any number of color components, including 1, 3 or 4 color components. For example, a four color component representation includes cyan, magenta, yellow and black color components. For a given application, when the number of color components used to represent a given color is set to 1, the color of a pixel is defined by the magnitude of a single color component (such as black). When the number of color components is set to three, the color components used can be cyan, magenta and yellow color components. When the number of color components is set to be four, the 4 color components mentioned above can be used to define the color of a given pixel.

Where each of four color components in each pixel of a pixmap is encoded with 8-bits, a letter-size page having approximately 32 million, 600 dots per inch (dpi) color pixels, requires approximately 128 Megabytes of memory to store the page. Because a memory requirement of 128 Megabytes per page is cost prohibitive, exemplary embodiments of the present invention are directed to compressing this data in a manner which ensures the integrity of color fidelity in the decompressed image.

3. Pre-processing of Image Data

As mentioned previously, uncompressed image data which is received for storage in the frame buffer is preprocessed to optimize the compression process. The preprocessing includes: (a) scaling a frame of digitized image data to ensure that each partitioned block will have the same number of pixels; (b) partitioning the frame into blocks having a predetermined number of pixels; (c) resampling the image data to account for misalignment between the frame of image data and partitioned blocks; (d) filtering to reduce the number of color variations within each partitioned block to a predetermined number; and (e) creating a side information buffer of information which identifies each block as either color variant, color invariant, of clear, to thereby enhance subsequent performance during compression. The preprocessing can be performed in a manner as described in commonly assigned U.S. application Ser. No. 08/397,372, filed Mar. 2, 1995 (Attorney Docket No. P1481/149), entitled "METHOD AND APPARATUS FOR COMPRESSION OF DIGITIZED IMAGE DATA USING VARIABLE COLOR FIDELITY", the disclosure of which is hereby incorporated by reference in its entirety. For example, the steps of partitioning and filtering can be implemented as follows.

a. Partitioning

In accordance with the exemplary embodiment described herein, each frame of image data is partitioned into blocks formed as 4-by-4 pixel arrays. The exact block size can be set by the user as a block size field stored in a register.

Those skilled in the art will appreciate that the partitioned blocks can have any number of pixels, and that the blocks can be of any desired shape. It is only preferable that the blocks are capable of being tiled in non-overlapping fashion to encompass the entire image. For example, the shape of each partitioned area need not be square, but can be rectangular, cross-shaped, or shaped as described in "Tilings and Patterns, an Introduction", by W. H. Freeman, New York, 1989, ISBN 0-7167-1998-3, the disclosure of which is hereby incorporated by reference.

Those skilled in the art will appreciate that such partitioning is not limited to a single shape, but can be a combination of shapes. Further, those skilled in the art will appreciate that non-tiled and/or non-overlapped blocks can be used at some possible expense to the compressed buffer size and/or the integrity of the compressed data relative to the original image.

b. Color Variation Limiting

In accordance with exemplary embodiments, the compressing of image data includes the step of classifying each partitioned block as color variant or color invariant. In connection with this step of classifying, the image data is processed to ensure that no partitioned block includes greater than a predetermined number of color variations. Such processing can be achieved in any number of ways.

In an exemplary embodiment, each partitioned block is limited to at most two different colors. The two colors which are retained can be those deemed furthest from one another in a given color space. However, those skilled in the art will appreciate that each partitioned block can be limited to any number of colors (for example, 7 or more colors).

For example, where each partitioned block is limited to two colors and where a given block includes the colors red, blue and light blue, the light blue pixels can be converted to blue. Where more than two colors within a partitioned block are separated from one another in a given color space by more than a predetermined amount (e.g., a partitioned block includes the colors green, red and blue), color averaging of the pixels can be used to determine a single averaged color for all pixels within the partitioned block. Where color averaging is used, a previously multi-color partitioned block can be subsequently treated as a color invariant block (that is, a single color block) during the compression process.

In addition to the techniques mentioned above, an arbitrary selection of the colors which are to be retained can be used. For example, the first two colors detected in each partitioned block can be selected as the two colors to which all pixels in that block will be mapped.

In yet another embodiment, the color of the first pixel examined can be selected as the first color, and the color of each subsequent pixel can be compared against that of the first pixel. The color deemed furthest from the first color in a given color space can be selected as the second color, and each pixel in block can be mapped to one of these two colors.

The foregoing techniques for limiting the color variations of a partitioned block to a predetermined number are by way of illustration only. Those skilled in the art will appreciate that any number of such techniques can be devised.

4. Compressed Data Format

In accordance with exemplary embodiments of the present invention, a compressed data format (CD) is used whereby a single data word represents an entire partitioned block of pixels. For example, a single data word of up to 32 bits can be used to reconstruct what was previously described by the sixteen 32-bit words of a 4-by-4 pixel array, without creating noticeable color degradation of the decompressed image regardless of whether the image includes scanned images, non-scanned images or any combination of the two.

The location of compressed data in memory of the compression/decompression coprocessor is defined by a compression data pointer register. Because exemplary embodiments described herein are directed to the use of memory space having 32-bit word locations, words of up to 32 bits can be specified as a user-defined compressed data width field. In accordance with exemplary embodiments, a "compressed data word" is used to represent a compressed data block, and all such compressed data blocks are stored back-to-back in memory, regardless of the specified compressed data width, to maximize the use of memory.

In accordance with exemplary embodiments, two different word formats are used for compressed data: (1) a compressed data format for partitioned blocks determined to be color variant; and (2) a compressed data format for partitioned blocks determined to be color invariant. Color variant blocks are encoded with high edge acuity and reduced color fidelity, while color invariant blocks are encoded with high color fidelity. In exemplary embodiments, the most significant bit in both the color variant data block and the color invariant data block, referred to as the select (S) bit, identifies the compressed block as being either color variant or color invariant (that is, non-variant).

a. Color Invariant Compressed Data Block

Figures 2A, 2B, 2C, 2D:
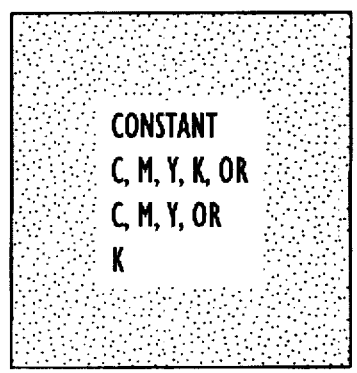
FIGS. 2a–2d illustrate an exemplary format for encoding color invariant image data.

A non-variance compressed data block, as illustrated in FIG. 2a, is used to encode the pixels in a partitioned block where all pixels have the same color (see FIG. 2d). The user can specify the number of bits used to describe each color component of the single color associated with the color invariant block of pixels. Thus, the number of bits used to define each color component, in conjunction with the number of color components selected by the user to represent each pixel, will define the bits of a non-variance compressed data block.

In an exemplary embodiment, the number of bits used to describe the color of a color invariant block must be at least one bit less than the total number of bits available to describe each compressed data block of pixels (that is, 31 in the above example) to account for the select bit. In the exemplary embodiment described herein, the user can select any of three different sets of color components; that is, (1) cyan, magenta, yellow and black; (2) cyan, magenta and yellow; or (3) a single color component. Accordingly, three different types of non-variance compressed data blocks can be used, as illustrated in FIGS. 2a, 2b and 2c. In each case, a different number of bits can be used to represent the color components without exceeding the 31 bit limit of the exemplary embodiment.

For example, where black is the only color component used, up to 31 bits can be used to represent the black component of FIG. 2c. Of course, the FIG. 2c format can also be used where only the yellow, magenta or cyan color component has been selected to represent non-variant blocks. However, where all of the cyan, magenta, yellow and black color components are used, up to 7 bits can be used to represent each of these components via the FIG. 2a format; in this case the total word length, including the select bit, would be 29 bits.

b. Color Variant Compressed Data Block

Figures 3A, 3B, 3C, 3D, 3E:
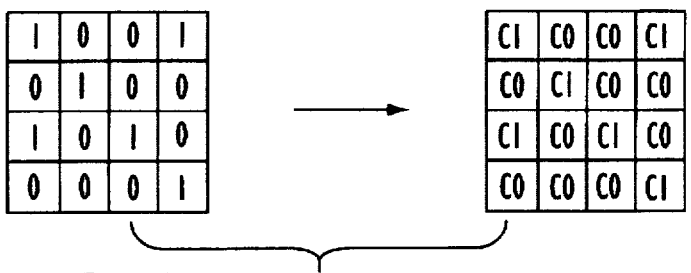
FIGS. 3a–3e illustrate exemplary formats for encoding color variant image data.

A color variant compressed data block, used to represent partitioned blocks that include pixels of various colors, is illustrated in FIG. 3a. An alternate embodiment of a color variant compressed data block is illustrated in FIG. 3b. These data formats include: (1) a predetermined number of indexed color locations; and (2) a mask for mapping each pixel of the partitioned, color variant block to one of the indexed colors. Recall that in accordance with exemplary embodiments, each partitioned block is pre-processed to include at most two different colors; the two colors for a given data block are, in an exemplary embodiment, represented in the compressed data blocks of FIGS. 3a and 3b as 6-bit color indices for a first color (C0) and a second color (C1).

The 6-bit values for C0 and C1, included within the variance compressed data block serve as indices for searching a variance color look-up table. In an exemplary embodiment, the variance color look-up table stores a plurality of 32-bit color values in 64 locations, with a specific location being addressed by the values of C0 and C1. For example, the first entry in the variance color look-up table can correspond to white and the last entry can correspond to black. All data entries in between correspond to various colors ranging from white to black, (that is, colors having varying amounts of the cyan, magenta, yellow and black color components).

As illustrated in FIG. 3a, the color variant compressed data block includes: a single bit location for the select bit; a 6-bit location for the color C0; a 6-bit location for the color C1; and a 16-bit mask wherein each bit corresponds to one pixel of the 4-by-4 block.

FIG. 3b illustrates the use of a compressed mask which serves as an index to a compression mask look-up table where a complete mask is stored. A compressed mask will be referenced herein as a mask index.

For partitioned blocks of 4-by-4 pixels having an uncompressed mask of 16 bits, compressed mask sizes of 8, 9 and 10 bits can be used in accordance with exemplary embodiments. However, those skilled in the art will appreciate that such mask sizes are by way of illustration only, and that any number of bits can be included in both the uncompressed mask and the compressed mask.

To accommodate use of the FIG. 3b mask format, the compression mask look-up table, which is pointed to by a mask base register, is included in memory. During compression, the 16 bit mask obtained from a 4-by-4 partitioned block can be used to index the compression mask look-up table which, in an exemplary embodiment, is a 64k entry table. In an exemplary implementation, each location in the mask look-up table stores two compressed masks, such that the table is actually configured in memory as a 32k-entry-by-32 bit table (note that multiple non-compressed masks can be mapped to the same compressed mask, if desired). During decompression, the mask base register points to a 1k decompression mask look-up table, which in an exemplary implementation, is actually configured as a 512 entry memory wherein each entry includes two decompressed masks.

FIG. 3c illustrates an exemplary embodiment of a 16 bit mask. The numbers shown in each of the FIG. 3c bit locations illustrate the manner by which the 16-bit mask maps to pixel locations of the 4-by-4 partitioned block illustrated in FIG. 3d. With the data format of FIG. 3a, the 16 bit mask is stored, in its entirety, within the compressed data block. However, with the data format of FIG. 3b, the 16 bit mask is stored in the compression mask look-up table pointed to by the mask base register and addressed by the mask index included in the compressed data block.

FIG. 3e illustrates an example wherein the binary values of a 16 bit mask in a color variant compressed data block map either the color C0 or the color C1 to each of the pixel locations of the 4-by-4 partitioned block. In accordance with an exemplary embodiment, a value of 0 at any given location of the 16-bit mask can be considered to correspond to the color C0, while a 1 at any of the 16-bit locations in the 16-bit mask can be considered to correspond to the color C1. Thus, a 16-bit mask having the binary values illustrated in the left hand side of FIG. 3e will map the colors C0 and C1 to the pixel locations shown in the right hand side of FIG. 3e.

The C0 and C1 values can, in an exemplary embodiment, also be stored as compressed values within the compressed data block of FIGS. 3a and 3b. In this case, an additional encoding table can be provided to expand the compressed C0 and C1 values to an address for the variance color look-up table.

c. Encoding of Variant Color Data Using a Compressed Mask

In accordance with exemplary embodiments of the present invention, the memory of requirements associated with storing compressed color variant data blocks can be enhanced by using a finite set of masks to represent a larger set of masks. In accordance with exemplary embodiments of the present invention, a mask is represented by a mask index which serves as an address to a look-up table during compression of the frame of image data. The look-up table stores a plurality of geometrical patterns defined by different color values for pixels included in each of the partitioned blocks obtained from the frame of image data.

In accordance with an advantageous embodiment of the present invention, the look-up table can be dynamically updated during the compression process, such that the geometrical patterns stored in the look-up table are selected using an iterative reprocessing technique. In accordance with exemplary embodiments, subsequent iterations can be executed when a number of geometrical patterns detected during processing of the frame of image data is determined to exceed a predetermined number.

Figure 10:
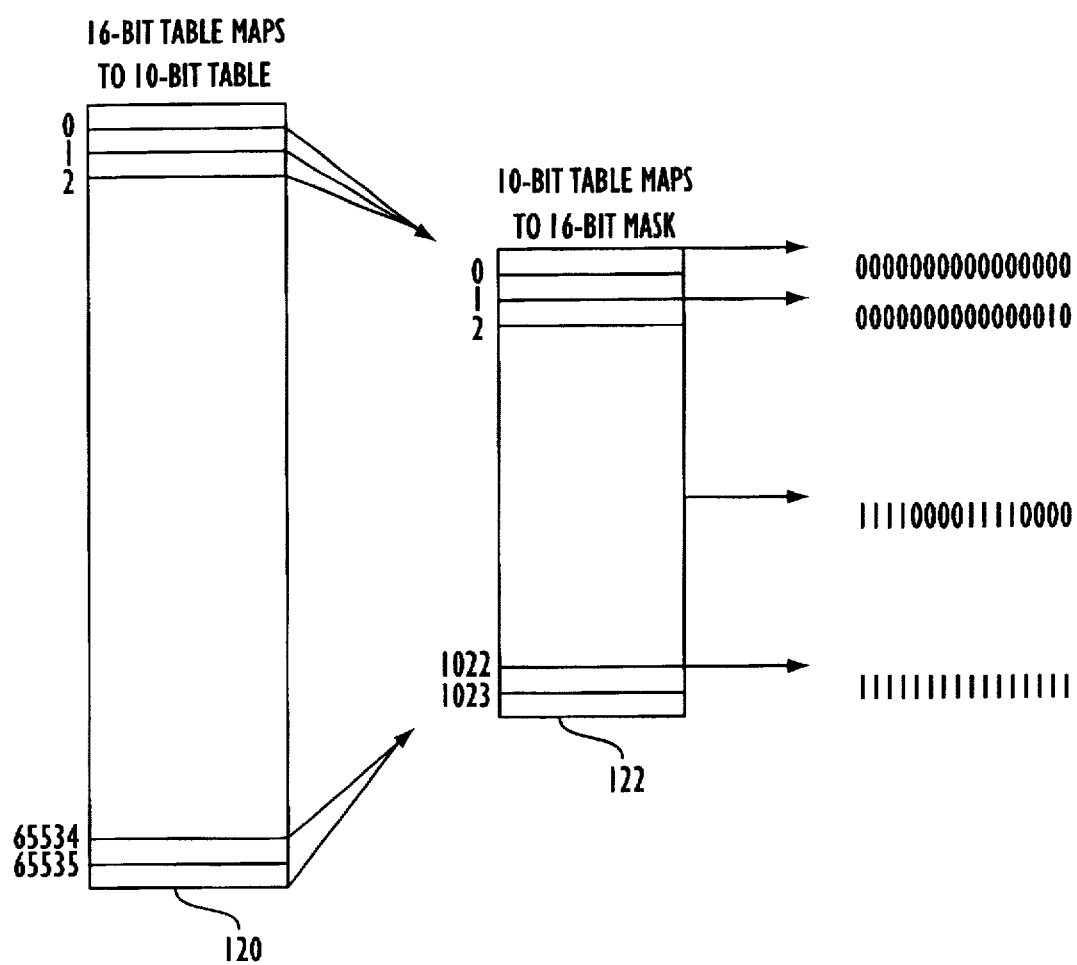
FIG. 10 illustrates an exemplary look-up table for dynamically compressing a mask used for color variant data blocks.

To render a discussion of an exemplary dynamic mask compression consistent with the foregoing discussion, mask compression of partitioned blocks having 16 pixels will be described. Referring to FIG. 10, a 16-bit look-up table 120 having 65,535 16-bit entries addressable by the 16-bit mask is illustrated. In accordance with exemplary embodiments, the 16-bit masks are mapped to a 10-bit mask index, representing a compressed mask. A 10-bit mask index can address up to 1,024 distinct mask patterns which are stored in a mask index look-up table 122. By using a 10-bit mask index rather than the full 16-bits associated with a 4×4 pixel, memory requirements can be substantially reduced and overall processing speed can be enhanced.

In accordance with exemplary embodiments, as each partitioned block in a frame of image data is received, the multiple color values associated with the pixels in this block are reduced to, in an exemplary embodiment, one of two values described previously as the color indices C0 and C1. Each of the 16 pixels included in the 4×4 partition block is then correlated to either the color value C0 or C1. As each partitioned block is processed, the 16-bit mask is placed into the 16-bit table of FIG. 10. Further, the first entry in this table is placed into the first entry of the 10-bit mask index look-up table, and the 16-bit mask is reduced to a 10-bit mask represented as the first address (e.g., 10 zeros) to the look-up table.

During this first iteration, if the entire frame of image data is processed and no more than 1,024 distinct mask patterns are detected, processing is complete and a reduction in memory size has been achieved by reducing the number of bits required to represent each partitioned block in a compressed data word, with no attendant sacrifice in accurately reproducing the original image. However, if greater than 1,024 distinct mask patterns are detected during processing of the frame of image data, compression of the 16-bit masks is necessary in order to comply with size constraints of the 10-bit mask index look-up table. In accordance with exemplary embodiments, when more than 1,024 distinct mask patterns are detected, a second iteration is performed whereby reprocessing of the 16-bit mask indices is performed to condense the total number of distinct mask patterns to a value less than 1,024.

For example, once it is determined that more than 1,024 distinct mask patterns exist, the 16-bit table and the 10-bit table can be iteratively reprocessed to remap each two adjacent mask patterns in the 16-bit table into one entry in the 10-bit table which is addressable by the same mask index. After this collapsing, or folding, of every two entries in the 16-bit table to a single entry in the 10-bit table, if the total number of distinct mask patterns still exceeds 1,024, the total number of bits in each mask index must be reduced again in a subsequent iteration. This process is repeated until 1,024 distinct mask patterns or less are recorded in the 10-bit look-up table.

During decompression, the 10-bit compressed mask index can be used to address the 10-bit table to produce a full 16-bit mask. Those skilled in the art will appreciate that some mask patterns in the original frame of image data will have been lost if multiple iterations were necessary during mask compression. However, exemplary embodiments will typically result in only minor changes in mask patterns between a decompressed mask pattern image and the original mask pattern. Further, because only partitioned blocks representing edge data having multiple colors are encoded using the compressed mask format in accordance with exemplary embodiments, such changes in mask pattern will have only negligible effect on overall fidelity of the decompressed image and, for the most part, will be unnoticed by the unaided eye. Thus, exemplary embodiments can achieve significant savings in memory without noticeably degrading the fidelity and reproducibility of an original image which has been processed through a compression/decompression technique in accordance with exemplary embodiments of the present invention.

In accordance with exemplary embodiments where more than a predetermined number of distinct mask patterns are detected during the first iteration (e.g., more than 1,024 distinct mask patterns), a reduction in the total number of mask patterns during a second iteration can be achieved by mapping both the first and second entries of the 16-bit look-up table to the first entry in the 10-bit look-up table as described previously. This process can be repeated for the next two entries in the 16-bit look-up table. This process is then repeated for the entire 16-bit look-up table.

If this attempt to reduce the total number of distinct mask patterns stored in the 10-bit look-up table is unsuccessful, then on the third iteration, a reprocessing of the 16-bit masks stored in the 16-bit look-up table can be achieved by mapping the first three entries of the 16-bit look-up table to the first entry of the 10-bit look-up table. The next three entries in the 16-bit look-up table can then be mapped to the second entry of the 10-bit look-up table. This process can be repeated until the entire 16-bit look-up table has been mapped to the 10-bit look-up table. However, if this attempt to reduce the total number of distinct mask patterns stored in the 10-bit look-up table to less than 1,024 entries is unsuccessful, then yet another iterative reprocessing can be performed.

In accordance with alternate embodiments, iterative reprocessing to reduce the total number of distinct mask patterns stored in the 10-bit look-up table to a value less than 1,024 can be implemented in any number of ways. For example, statistical analysis can be used to identify those mask patterns which have occurred most frequently in the original frame of image data, and to delete from the 10-bit look-up table those 16-bit mask indices whose frequency of occurrence is below a statistically determined value. Such a processing would free up additional entries in the 10-bit look-up table so that during a subsequent iteration through the 16-bit look-up table, 16-bit mask indices which have a frequency of occurrence greater than the predetermined number can be mapped to the remaining entries of the 10-bit look-up table.

Alternately, groups of 16-bit mask patterns determined in advance to have no perceivable differences to the unaided human eye when reproduced in a decompressed image can be correlated to one another in a separate correlation look-up table. If during a first iteration it is determined that more than 1,024 distinct mask patterns exist, a search through this correlation look-up table can be performed to identify 16-bit mask indices in the 16-bit look-up table which can be mapped to the same 10-bit value without producing noticeable distinctions in the decompressed image.

For example, a 16-bit mask representing a partitioned block wherein the third row of the 4×4 array is of one color and all remaining pixels are of another color can be correlated and then mapped to the same mask index used for another 16-bit mask of a 4×4 array wherein all but the second pixel in the third row are of one color and all remaining pixels are of the other color. These two different geometrical patterns can be mapped to the same mask index without producing noticeable degradation to the decompressed image when viewed by the unaided eye.

Any empirical data can be acquired to determine in advance those mask patterns which can be mapped to the same 10-bit index without degrading quality of the decompressed image. The correlation table can then be configured in a hierarchical order such that 16-bit mask indices which produce the least noticeable effects on the decompressed image will be correlated first (for example, during an early iteration), while a correlation of 16-bit mask indices which produce some minimal degradation in the decompressed image will be correlated last (for example, during later iterations of the 16-bit look-up table).

Those skilled in the art will appreciate that the foregoing exemplary embodiments of dynamic mask compression are by way of illustration only and that any number of techniques can be used to compress the masks. Further, those skilled in the art will appreciate that the use of a 16-bit mask for a 4×4 array is by way of illustration only, and that as a number of pixels in a partitioned block is increased or decreased, the number of bits in the uncompressed mask can be modified accordingly to any number of bits. In addition, the use of a compressed mask of 10-bits is by way of illustration only, and those skilled in the art will appreciate that compressed masks of any width can be used in accordance with exemplary embodiments of the present invention. Further, any number of techniques can be used for mapping the uncompressed masks into compressed masks. For example, upon immediate detection of an overflow condition of the 10-bit look-up table, an immediate mapping of the uncompressed mask to a compressed mask of predetermined size can be implemented.

d. Encoding of Variant Color Data for Variance Color Look-Up Table

In the exemplary embodiment described, color invariant compressed data blocks can use the entire 29 bit data block to represent a single color and thereby preserve high color fidelity. However, the exemplary color variant compressed data blocks use an exemplary 6-bit color index (that is, C0 or C1) to select a 32-bit color value from a 64 entry variance color look-up table. Because only 6-bits are used to represent a color, all colors extant throughout the world must be represented by the 64 colors included in the variance color look-up table. As described previously, color fidelity of color variant blocks is therefore sacrificed to preserve high edge acuity and reduce memory requirements. Recall that high edge acuity is obtained by encoding each of 16 pixels in a block with one of at least two different colors are used to define edges in the image.

By using both color invariant data blocks and color variant data blocks, high edge acuity can be preserved in partitioned blocks which include edge information, while high color fidelity can be preserved in partitioned blocks which are color invariant (that is, blocks which do not include edge information). While color fidelity of color variant data blocks could easily be improved by increasing the number of bits used for each color index C0 and C1 (thereby increasing the number of 32-bit color entries included in the variance color look-up table), an increased width of the color variant data block would sacrifice processing speed to such an extent that real-time processing of an incoming data stream could become prohibited. Accordingly, a goal of exemplary embodiments described herein is to optimize color fidelity of decompressed images generated from color variant data blocks while keeping the overall width of color variant data blocks (for example 29-bits) comparable to that of color invariant data blocks.

In accordance with exemplary embodiments of the present invention, a method and apparatus are provided for encoding the seemingly infinite array of different colors using only the 64 entries of the variance color look-up table. The 64 entries are chosen in a manner which optimizes color fidelity of an image that is reproduced from the color variant compressed data blocks.

Figure 8:
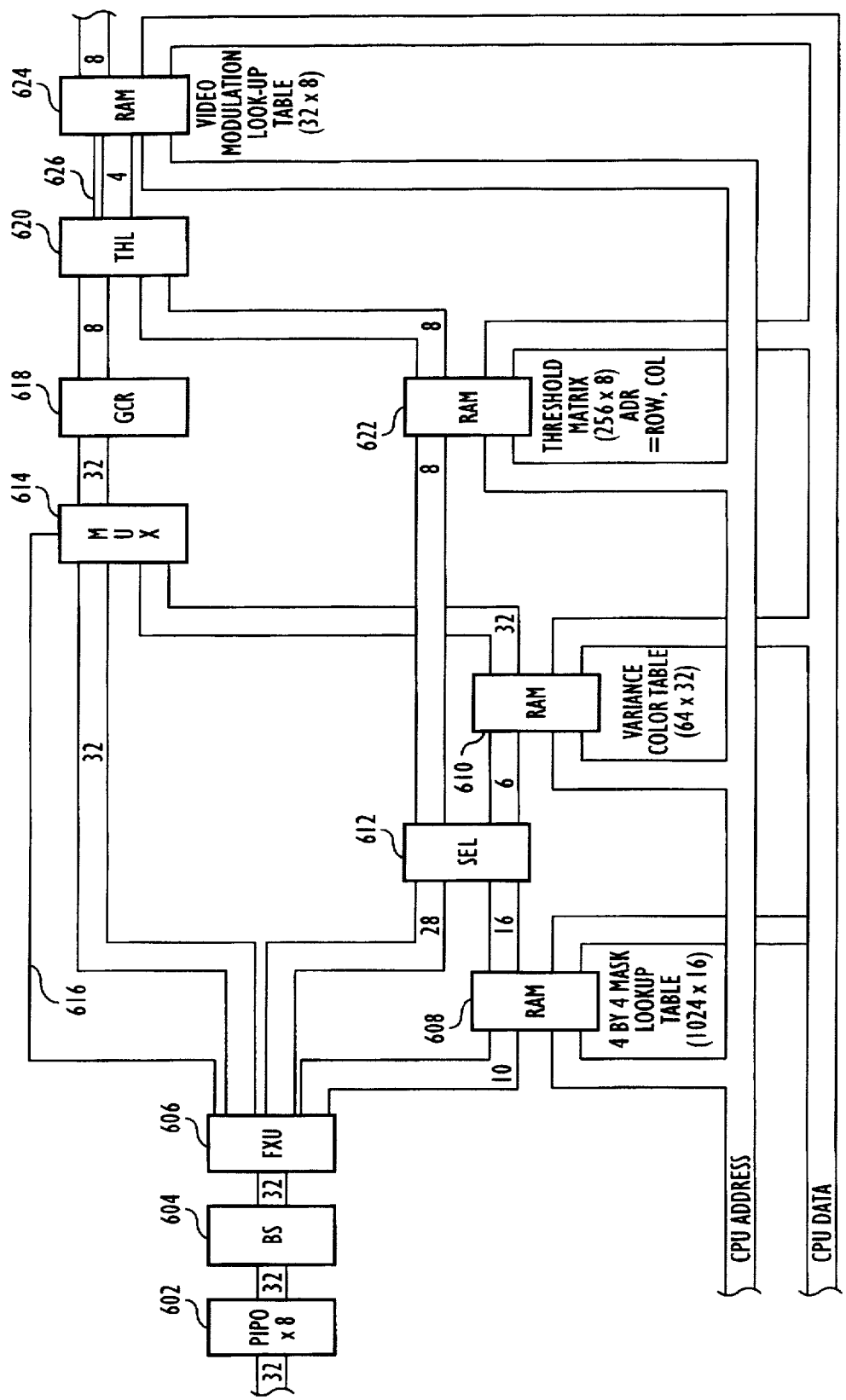
FIG. 8 illustrates an exemplary embodiment of hardware for decompressing data.

FIG. 4a illustrates uncompressed image data representing at least one color component of a monochrome or color image for an exemplary pixel of a pixmap. In the FIG. 4a illustration, each of four color components used to represent the pixel is encoded with 8-bits. As shown in FIG. 4a, 8 bits are used to represent each of cyan (C), magenta (M), yellow (Y) and black (K) color components, such that a total of thirty-two bits are used to represent a single pixel of color data.

Recall that the color variant compressed data blocks of FIGS. 3a and 3b represent each pixel in a partitioned block of pixels (for example, 16 pixels) with one of two 6-bit color indices. All colors known to exist are therefore reduced to one of sixty-four 32-bit color entries stored in the variance color look-up able so that a decompressed 32-bit representation of color can be obtained for each pixel using the 6-bit index. In other words, the original 32-bits used to represent the color of each pixel in an input stream of image data are reduced to a 6-bit representation.

Note that while FIG. 4a illustrates a 32-bit color as having four 8-bit components, those skilled in the art will appreciate that any number of color components, represented with any number of bits can be used. For example, the 32-bits can be used to represent single color components (for example, grey scale images, or images formed of different shades of the same color). Those skilled in the art will also recognize that the 32-bits can be separated among the designated color components, in any desired manner. For example, a greater (fewer) number of bits can be used to represent a fewer (greater) number of color components. Further, while CMYK values are shown, those skilled in the art will appreciate that any known color space can be used (for example, RGB values).

In accordance with exemplary embodiments of the present invention, the encoded color indices are obtained from an exemplary 512 entry C0/C1 encoding table that is addressed by a 9-bit value. The 9-bit value used to address the C0/C1 encoding table is, in an exemplary embodiment, obtained from the 32-bit color value of the pixel by first dropping the four least significant bits of the cyan, magenta and yellow color components, leaving 20 bits. A predetermined combination of 9-bits is then selected from among these 20-bits. The 9-bits selected can be varied (that is, programmed) as desired based on any user specified criteria.

Figure 5A:
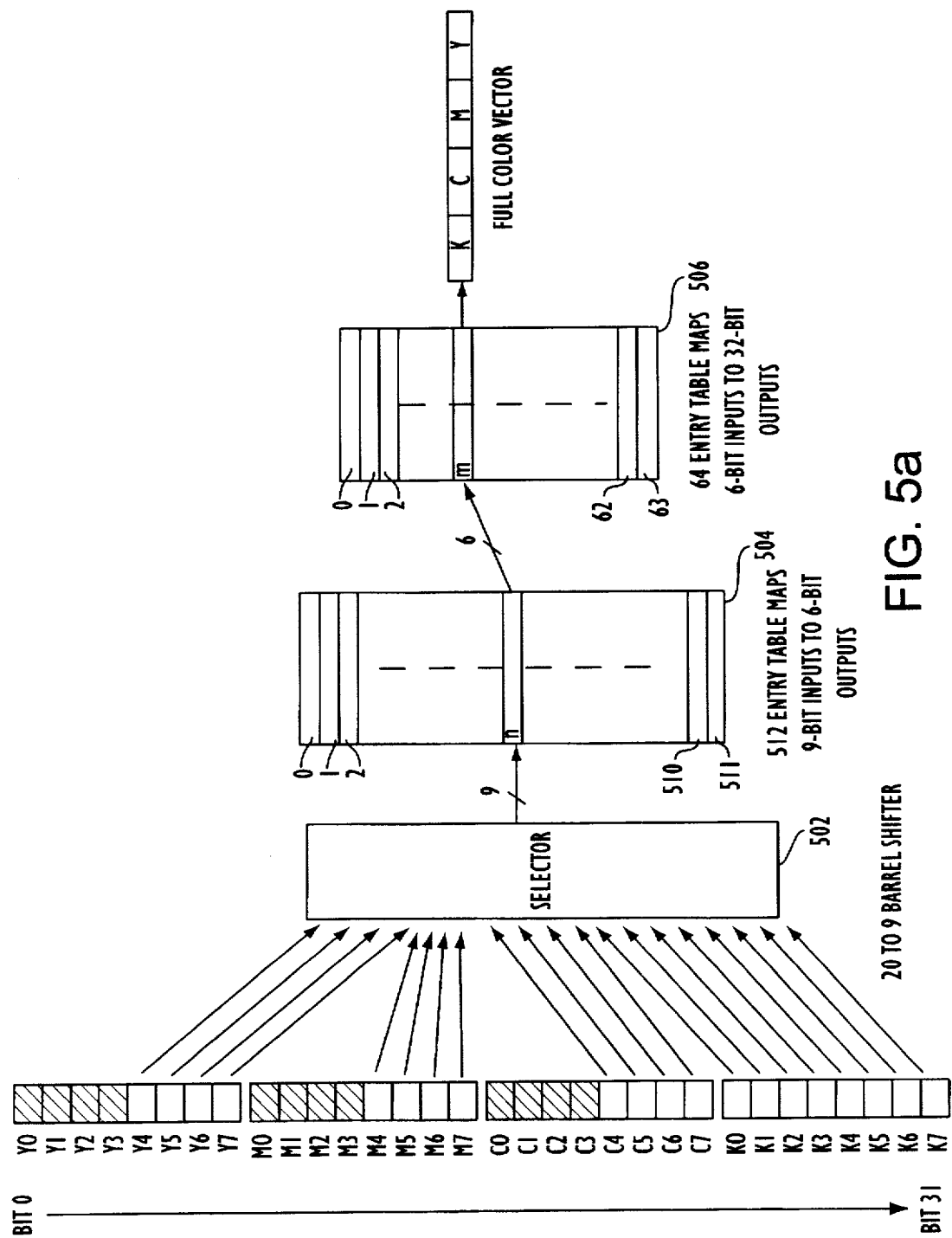
FIGS. 5a–5c illustrate exemplary embodiments of an apparatus for compressing image data in accordance with the present invention.

FIG. 5a represents a means for compressing the quantized image data within each partitioned block, and can, in an exemplary embodiment, be included as a hardware device in the compression/decompression coprocessor 108 of FIG. 1. In FIG. 5a, the 32-bits of the image data for the single pixel shown in FIG. 4a are illustrated as input values Y0–Y7, M0–M7, C0–C7 and K0–K7, corresponding to each of the yellow, magenta, cyan and black color components, respectively. These 32 bits are supplied as the input to a means, such as a selector 502, for prequantizing at least one color component of the image data by selectively eliminating predetermined bits used to represent at least one color component of a single pixel. The selector 502 can be a 20-bit-to-9-bit barrel shifter which receives inputs from 20 predetermined bit locations of the 32-bit image data. These 20 predetermined bit locations can be fixed in advance by the user, and reconfigured as desired.

In the exemplary FIG. 5a embodiment, the 20 selected bit locations include the four most significant bits used to represent each of the yellow, magenta and cyan color components. By also retaining the 8-bits of the black color component in the exemplary embodiment illustrated, all 256 shades of grey can be retained and used to control the black toner of a monochrome printer. The resultant bit locations received by the barrel shifter 502 are illustrated in FIG. 4b, wherein portions of the color pixel lost after this initial compression are shaded.

The barrel shifter further prequantizes the image data by reducing the 20 selected bits to a 9-bit value. The 9-bits which are selected can, for example, be the three most significant bits for black, and the two most significant bits for each of the cyan, magenta and yellow color components. However, any combination of the bits can be used, such as the first, fourth and last bit of the black color component, and the first and fourth remaining bits of the cyan, magenta and yellow color components, or any other combination of bits. In an exemplary embodiment, the hardware barrel shifter thus functions as an interconnected matrix that can be altered by the user as desired (for example, on a page-by-page basis), or in response to any user selected criteria. Those skilled in the art will appreciate that software or any combination of hardware and software can be used to implement the selection process.

In the first prequantization level of compression, the 32-bit image data is thus selectively prequantized to encode the 32-bit input for each pixel as a 9-bit value. This prequantization achieves a seventy-two percent reduction in going from a 32-bit color pixel to a 9-bit color pixel.

In a second level of compression, the remaining 9-bits of prequantized image data are encoded to further compress the image data. In an exemplary embodiment, the 9-bit output of the barrel shifter is used to address the C0/C1 encoding table 504 of FIG. 5a which, in an exemplary embodiment, includes 512 entries. Each 9-bit address to the C0/C1 encoding table produces a 6-bit output which can be used as a color index.

Regardless of how C0 and C1 are selected from among the color indices associated with a given partitioned block in a frame of image data, all such color indices are generated using only two passes of color encoding. That is, the prequantizing pass followed by the encoding pass results in encoding the color of each 32-bit pixel as a 6-bit index (an eighty-one percent reduction).

The encoding of a 6-bit color index from a 9-bit value, in an exemplary embodiment, involves mapping each of the 9-bit values to one of the 64 colors in the variance color look-up table, represented as variance color look-up tale 506 of FIG. 5a. This mapping can be achieved in any known fashion.

e. Dynamic Color Matching

In accordance with exemplary embodiments, empirical data can be acquired to identify the most visually pleasing color representation to be stored in the variance color look-up table based on colors expected to be present in the input image data as described in commonly assigned co-pending application Ser. No. 08/463,787, filed Jun. 5, 1995, (Attorney Docket No. P1574/251) entitled "METHOD AND APPARATUS FOR ENCODING COLOR IMAGE DATA", the contents of which are hereby incorporated by reference in their entirety. This technique for storing values in the variance color look-up table thus involves identifying the colors to be included in the original image data and then rendering the image to identify 64 color values which represent the image with acceptable color fidelity. However, in accordance with an exemplary embodiment of the present invention, color values stored in the variance color look-up table are dynamically selected (such as the look-up table 506 of FIG. 5a).

As each 32-bit color value is obtained from a pixel in the original image data, 9-bits from this 32-bit value can be selected and mapped to a 6-bit index which identifies the first location in the variance color look-up table 506. The first color value stored in the variance color look-up table 506 is therefore the 32-bit value corresponding to the 32-bit color of the first pixel in the original frame of image data. As subsequent pixels in the original image data are received, each new color which is detected can be mapped in similar fashion to a 6-bit index value and the color value of the new color can be stored in the next sequential location of the variance color look-up table addressable by the 6-bit index value.

In accordance with an exemplary embodiment, this process can continue for each block in the frame of image data. If no more than 64 different colors are detected in the current frame of image data being processed, all detected colors of the input image data will be mapped to a color value entered into the variance color look-up table. The entries in the variance color look-up table therefore accurately represent the original 32-bit color values of the input image data.

However, if during processing a frame of image data, more than 64 different 32-bit color values are detected, all such values cannot be stored in the 64 entry variance color look-up table 506. Accordingly, exemplary embodiments include a step of dynamically updating the plurality of color values stored in the variance color look-up table when the number of colors detected in the frame of image data exceeds a predetermined number (for example, the predetermined number would be 64 in the foregoing discussion). A dynamic updating of the plural color values stored in the variance color look-up table can, in accordance with exemplary embodiments, be achieved by iteratively processing the bits used to represent each detected color in the frame of input image data.

An exemplary iterative process for encoding bits used to represent each detected color in the frame of image data and for dynamically updating the color values stored in the variance color look-up table can be performed by repeating the process described above. However, because more than 64 different colors were detected in the first iteration of processing, the re-processing of the input frame of image data can be performed by reducing the number of bits selected from the 32-bit color value of the image data. For example, rather than selecting 9-bits, 8-bits can be selected. The reduction from 9-bits to 8-bits can be achieved by reconfiguring the programmable selector 502 to select only 8 of the original 32-bit color values associated with each pixel.

For example, rather than selecting the two most significant bits for each of the cyan, magenta and yellow color components and the three most significant bits of the black color component, only the two most significant bits of all color components (that is, including the black color component) can be selected. Consequently, only 32-bit color values of the input image data which include a change in any of the two most significant bits for any color component will be mapped to a 6-bit index.

Because the variance color look-up table can no longer provide a one-to-one correspondence to actual colors included in the original image, measures must be taken to preserve color fidelity. For example, the entire three dimensional color space used to represent the original 32-bit color values can be divided in 256 non-overlapping areas. Each detected color in the input frame of image data can then be mapped to one of these 256 areas using the 8 selected bits from each pixel.

In other words, the color which is stored in the color variance look-up table for a given 32-bit color value can be determined by mapping each 32-bit value having the same digital values for each of the selected 8-bits to the same color in the 64 entry variance color look-up table. This color can, for example, be: (1) the first 32-bit color in the frame of image data which was detected to fall within the color space area defined by the 8 selected bits; (2) the last 32-bit color in the frame of image data detected to fall within the color space area defined by the 8 selected bits; (3) any color in between the first and last colors, as selected in any number of ways apparent to those skilled in the art (for example, the 32-bit color which is stored in the variance color look-up table can be a 32-bit representation of a color in the color space area statistically determined to occur most frequently in the original image data); or (4) any color selected by mathematically processing (for example, averaging) any one or more color values detected in the frame of image data and being associated with the same color space area. Any of these techniques, or any combination of these and other techniques, can be repeated for each of the 256 color space areas having at least one color included in the original frame of image data.

As an alternate to selecting 8 rather than 9 of the original 32-bits for each pixel during a second iteration, the re-processing can be executed using an additional look-up table for mapping the 9-bit values identified during the first iteration into the 8-bit values. The 9-bit-to-8-bit mapping can be achieved by dropping the least significant bit of the 9-bit value and encoding every two 9-bit values to a single 8-bit value. For each 8-bit value, one of the two 32-bit colors previously identified with respect to the 9-bit values can then be selected and stored in the variance color look-up table at a location identified by the 6-bit index. This process can be continued for the entire frame of image data.

To expedite processing, the remapping of the 9-bit values to 8-bit values can be implemented by merely reprocessing the data encoded into the C0/C1 encoding table and the variance color look-up table during the first iteration. The reprocessing of data in these tables can be performed up to the point where 64 different colors were identified during the first iteration, since that was the point at which processing was discontinued during the first iteration. From that point on, the original frame of image data can be processed to fill-out the C0/C1 encoding table and the variance color look-up table with color information.

Provided no greater than 64 different color values are detected via use of the 8-bit digital values, no further encoding is necessary. Thus, all 8-bit values can be mapped to 6-bit indices for addressing the variance color look-up table.

However, if greater than 64 colors are still detected even when only 8-bits are used to represent each of the 32-bit values, a further iterative re-processing of the frame of image data can be performed to further reduce the number of bits from 8 to some other value (e.g., 7). This process can be performed, as described above, by either immediately selecting only 7-bits of the original 32-bits for each color value, or another look-up table can be provided for mapping the 8-bit values to 7-bit values which are then encoded into the 6-bit index values.

Alternately, if it is determined at any time during image data processing that greater than 64 colors exist in the original frame of image data, the color values in the original frame of image data can be directly mapped to 6-bit index values associated with a variance color look-up table having predetermined color values stored therein. Such a process can, for example, be implemented by iteratively re-processing the frame of image data to select 9-bits, and then immediately mapping the 9-bit values to the 6-bit index values. The color values stored in the variance color look-up table can, for example, be determined by using a pre-stored set of color values obtained by rendering a representative image, prior to processing the frame of image data.

Alternately, because it is known during the second pass that greater than 64 colors existed in the original frame of image data, the originally detected 64 different colors can be represented by some predetermined number of colors which are less than 64. For example, the original 64 colors detected during the first iteration can be reduced to 32 colors which are then stored as the first 32 entries of the variance color look-up table. As a result, 32 entries remain in the 64 entry variance color look-up table. The reduction of the original 64 different colors to 32 different colors for storage in the variance color look-up table can be performed in any known manner. For example, colors which are determined to be within a predetermined distance from one another within a given color space, such as the C,M,Y,K color space, can be represented by a color located at an averaged position for those colors.

Thus, those skilled in the art will appreciate that colors stored in the variance color look-up table can be dynamically selected to accurately represent colors included in the original frame of image data or, under certain conditions, can be selected wholly independent of the original 32-bit colors values included in pixel of the incoming image data. The flexibility associated with exemplary embodiments described herein can be exploited such that the dominant colors included within any frame of image data are dynamically identified on a page-by-page basis. Based on this identification, the selector, the C0/C1 encoding table and/or the variance color look-up table can be modified. Alternately, a different C0/C1 encoding table and/or variance color look-up table can be selected for compression based on the dominant colors identified. In other words, the colors that best represent a given frame can be used in conjunction with the compression of image data associated with that frame.

Figure 5B:
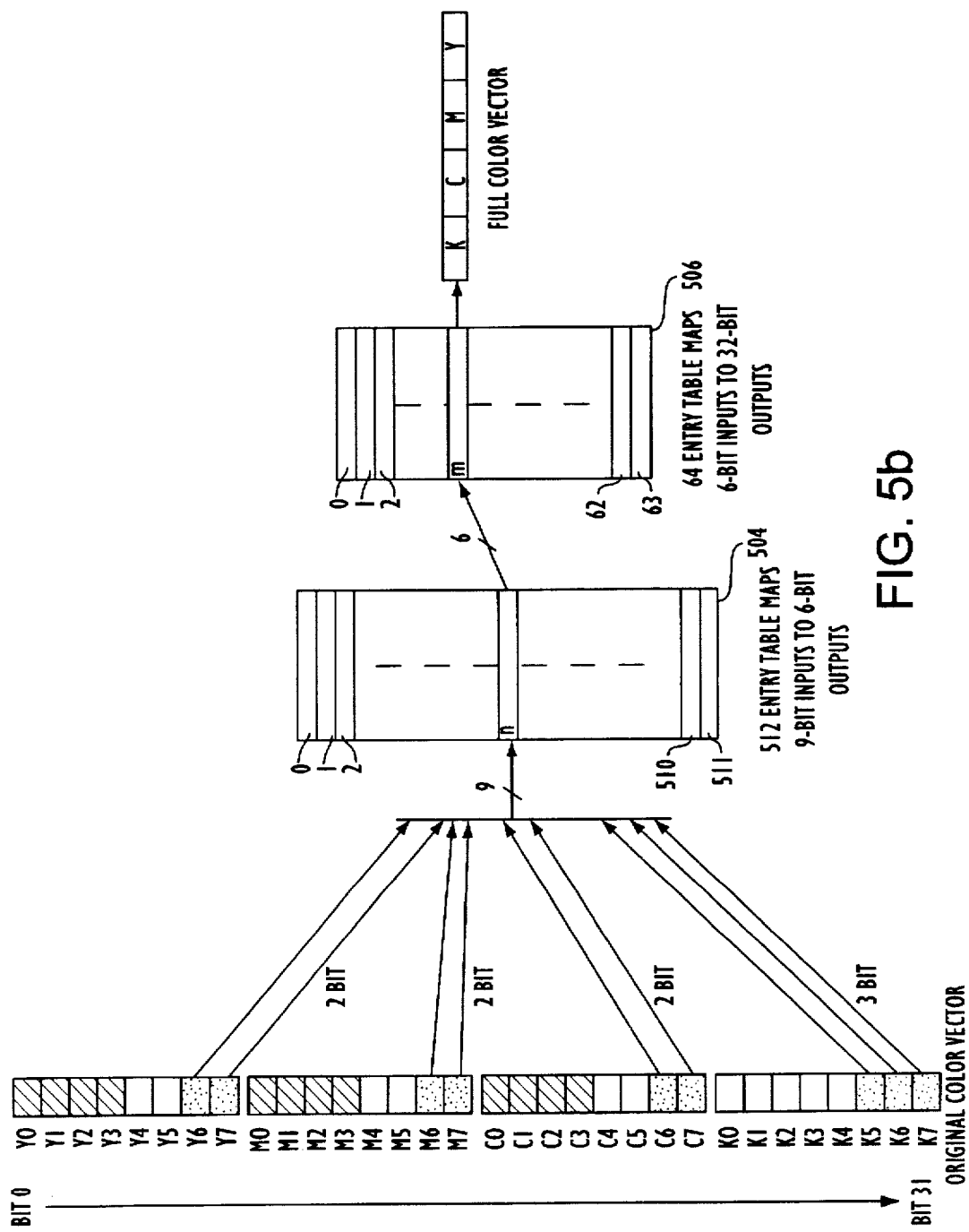
Figure 5C:
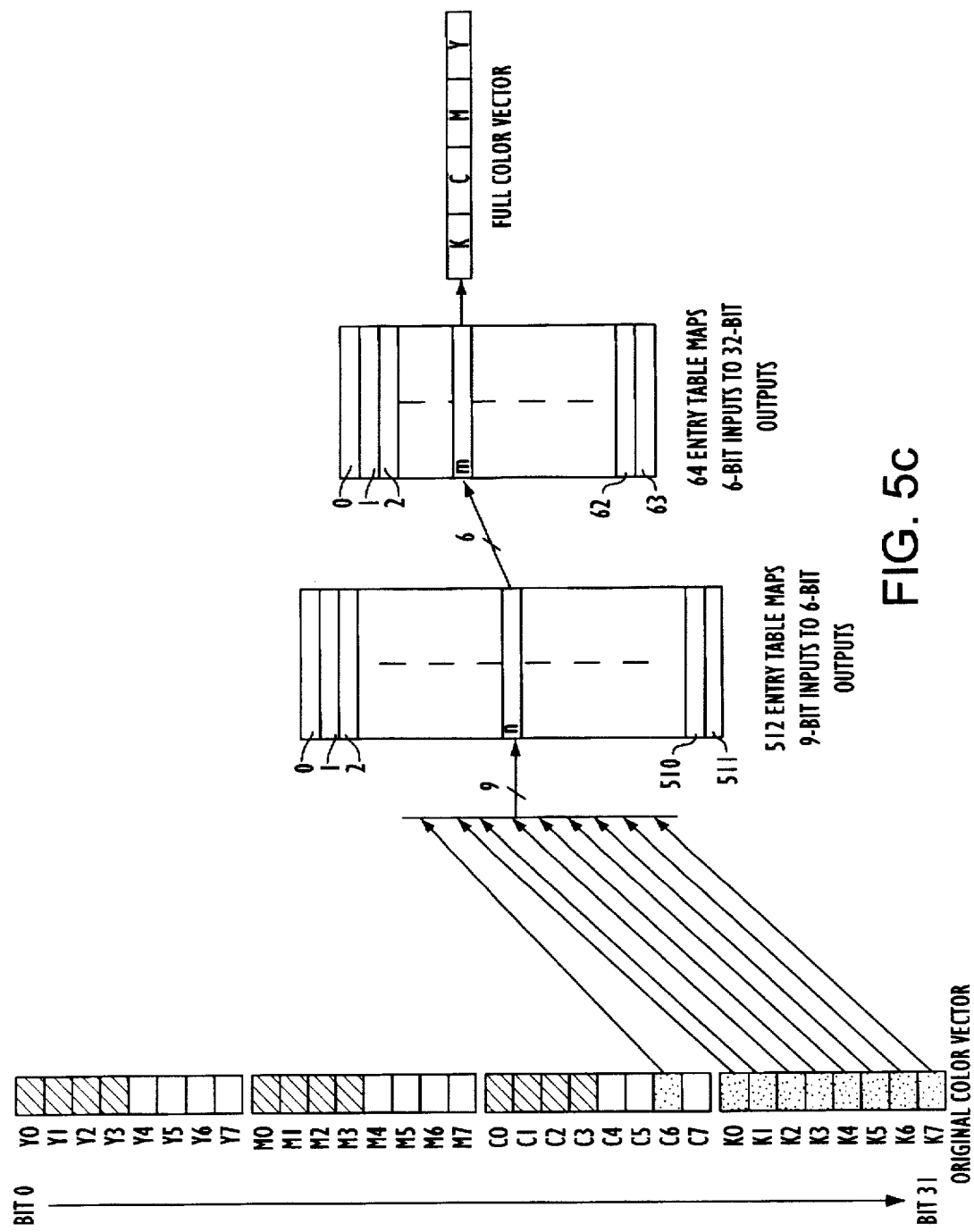

FIG. 5b illustrates an alternate embodiment wherein the first and second steps of prequantization described with respect to FIG. 5a are implemented by directly selecting a set number of bits (for example, 9-bits to be consistent with the FIG. 5a example). The set number of bits is then encoded to compress the prequantized data into a color index (for example, a 6-bit color index) used to address the variance color look-up table. FIG. 5c illustrates an exemplary embodiment where the prequantization of FIG. 5b results in a user-configured selection of 1-bit of cyan and all 8-bits of black.

Those skilled in the art will appreciate that the dynamic encoding of color values during image processing in conjunction with the use of a two level color encoding in accordance with exemplary embodiments, provides a relatively high level of color fidelity for partitioned blocks of image data which include edge information. Further, a two level color encoding which includes a single encoding table (that is, the exemplary 512 entry C0/C1 encoding table), provides high speed compression suitable for real-time processing.

Exemplary embodiments of the present invention therefore provide the user a high degree of flexibility by allowing for the arbitrary selection of many combinations of C,M,Y and K image data. The selector can be used to quickly reduce the input-image data in a manner which does not inhibit adaptability to any user-specific criteria. Further, the selector generates an output (the exemplary 9-bit value) that can address an encoding table, the output of the encoding table being an index which represents a color that is dynamically selected to provide an optimal representation of the original 32-bit color data.

5. Compression/Decompression Coprocessor (CDC)

a. CDC Configuration - Compression

Figure 6:
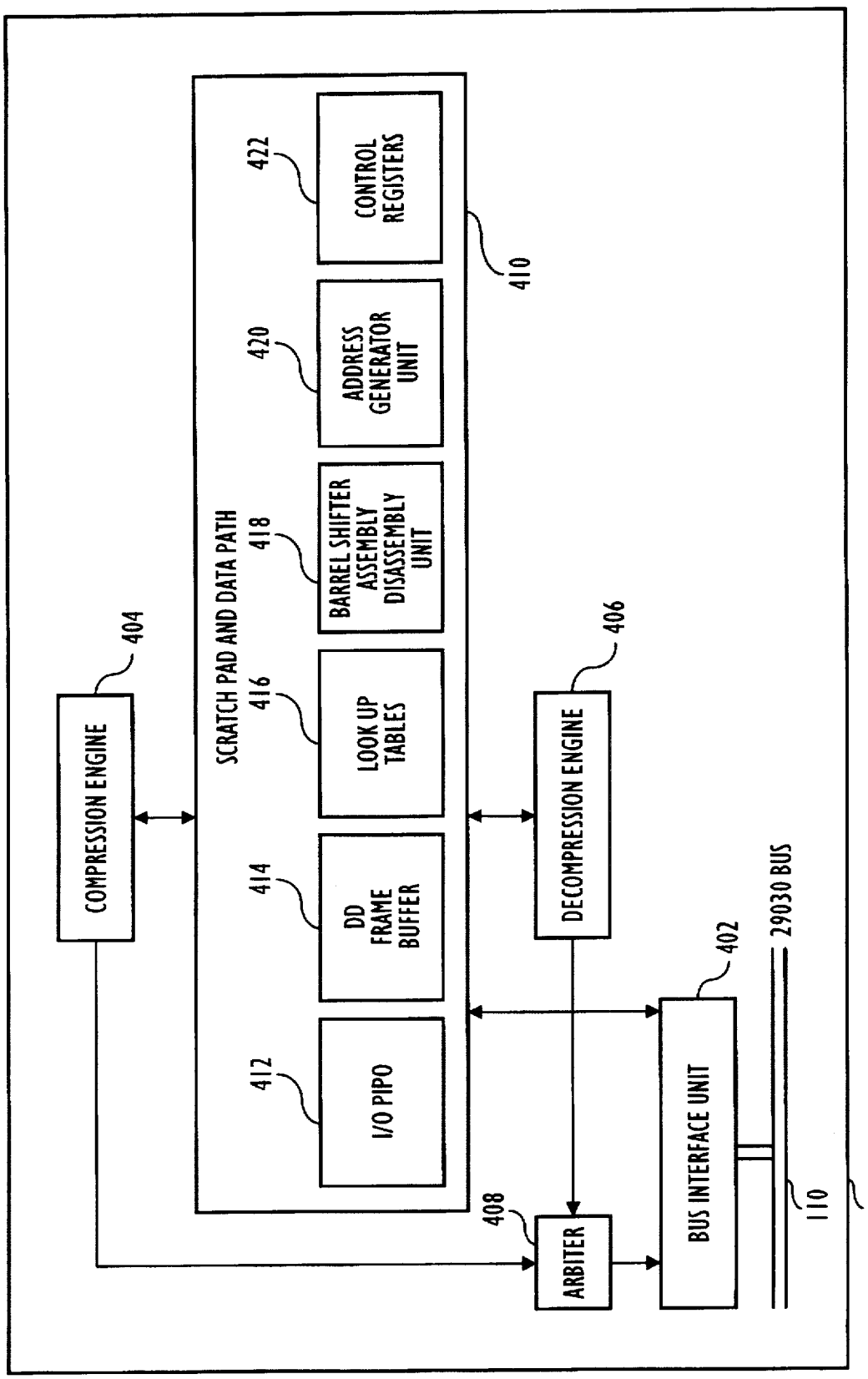
FIG. 6 illustrates an exemplary embodiment of a compression/decompression coprocessor for use in accordance with the present invention.

FIG. 6 illustrates a more detailed diagram of the exemplary compression/decompression coprocessor 108. The compression/decompression coprocessor 108 is interfaced to the system bus 110 via a bus interface unit 402. The compression/decompression coprocessor 108 includes a compression engine 404 and a decompression engine 406.

In an exemplary embodiment, the decompression engine 406 is used during the compression process. Recall that an entire frame of image data is not stored and processed at a single time, but rather is processed sequentially through the decompressed data frame buffer. The decompression engine of the compression/decompression coprocessor accommodates a situation where newly received image data is to be superimposed on portions of the frame which have been earlier compressed. In this situation, the earlier data is decompressed, and placed back into a frame buffer where it is overlaid with the incoming decompressed data. The later portion of the frame is therefore superimposed on the earlier processed data.

Access to the bus interface unit 402 by the compression engine 404 and the decompression 406 is controlled by an arbiter 408 which functions in any conventional manner. A scratch pad and data path block 410 is also provided and includes, among other features, resources such as registers and look-up tables used during operation of the compression/decompression coprocessor.

The scratch pad and data path block 410 includes an input/output first-in, first-out (I/O FIFO) buffer 412 for buffering information of the compression/decompression coprocessor. A decompression data frame buffer 414 (DD frame buffer) is also included, and is a double-buffered memory (as are most of the internal buffers). As one buffer of the DD frame buffer becomes full, the compression/decompression coprocessor can access data from that buffer while the bus interface unit 402 begins to fetch and load incoming image data to the other buffer.

The look-up tables 416 of the scratch pad and data path block 410 include the 64-entry variance color look-up table and the C0/C1 encoding look-up table. The variance color look-up table stores the limited range of colors used to describe partitioned blocks which are determined to be color variant (recall that a compression technique of the present invention encodes color variant blocks with reduced color fidelity). The C0/C1 encoding look-up table includes encoded values for C0 and C1. The compression and decompression mask look-up tables are also stored. As will be apparent to those skilled in the art, all of these tables can be included in a single memory, or can be stored in separate memories.

A barrel shifter assembly/disassembly unit 418 is also included in the scratch pad and data path block. In an exemplary embodiment the number of bits in a compressed data word can be less than the number of bit locations allocated to each word in memory. Recall that in an exemplary embodiment, 29 bits are used to represent a partitioned block in compressed form, while exemplary words in memory are 32 bits. However, the compressed data words are loaded one next to the other in memory (that is, all 32 bits of each word location in memory are used to store compressed image data). Therefore, to provide accurate read-out of compressed data, barrel shifting is used to shift a compressed data word in memory before each field of that word is extracted.

An address generator unit 420 is also included in the scratch pad and data path block. The address generator accesses locations of the various registers and look-up tables included within the compression/decompression coprocessor.

Figure 7:
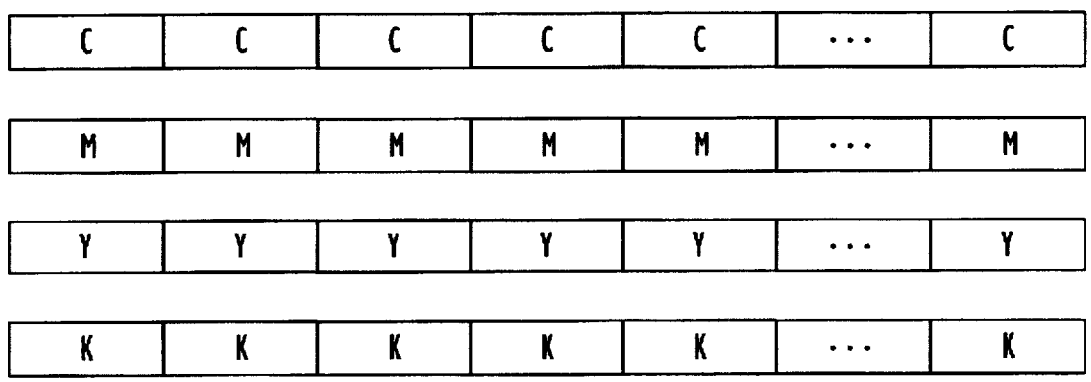
FIG. 7 illustrates an exemplary format for storing color data in memory.

The control registers 422 include an identification (ID) register for storing system revision and identification information. A vector table pointer register is accessed to identify the locations in memory where compressed and decompressed image data is stored for a given row of partitioned blocks. In an exemplary embodiment, a separate plane in memory is used for each of the cyan, magenta, yellow and black color components, as illustrated in FIG. 7. Accordingly, the vector register table includes a cyan pointer register, a magenta pointer register, a yellow pointer register and a black pointer register. The vector register table also includes a side information pointer register and a compressed data pointer register. Each color component is represented by 7-bits which identify one of up to 128 values for each color component.

For color variant blocks, the mask base register and the C0/C1 encoding select register are accessed. These registers map the original 32-bit color in a color variant partitioned block of each pixel to colors included in the reduced color look-up table (that is, the exemplary 64 entry variance color look-up table).

The horizontal total pixel count register, and the vertical total pixel count register, which store values representing the total number of pixels in each row and in each column, respectively of an incoming frame of image data, are also included in the registers 422. A vertical offset register can also be included to store an address offset between vertically adjacent pixels in an image to accommodate use of a one-dimensional memory for storing a two-dimensional image. Other registers are included for interrupt, enable and acknowledgement, command, operation status, and test functions.

It is apparent from the foregoing discussion that in an exemplary embodiment, the compression operation is implemented using both hardware and software. However, to enhance the performance of the compression operation, the decompression functions of an exemplary embodiment are primarily implemented in hardware. The decompressor functions implemented in an exemplary compression/decompression coprocessor are, for the most part, identical to those of the video interface device 112 (FIG. 1). FIG. 8, which illustrates exemplary hardware processing included within the video interface device, will therefore be used to describe the exemplary hardware decompression of the compression/decompression coprocessor.

b. CDC Configuration - Decompression

Referring to FIG. 8, decompression is initiated by fetching compressed data in the form of compressed data blocks from memory locations identified by a compressed data pointer register. The compressed data blocks are loaded into the compressed data input first-in first-out memory 602, non-variance data being loaded from locations identified by the vector table pointer register to accommodate the use of different color planes in memory. Because compressed data blocks can span word boundaries of memory, two compressed data blocks (that is, two data words) are loaded into a 64-bit register 604 and barrel shifted to the right by an amount indicated by the specified width of a compressed data word before each color field is extracted.

A field extraction unit 606 then extracts each color field of the compressed data word. If the compressed data block is of the non-variance type, then up to the four color components previously mentioned are extracted. If the compressed data block is of the variance type, then the mask is extracted along with the C0 and C1 values. Color fields which are less than 8-bits wide are replicated to an 8-bit width to provide, for four color printing, a 32-bit compressed data block.

For a variance block, mask look-up is performed if a mask compression mode had been selected. If mask look-up is required, the 1k entry decompression mask look-up table 608 is searched using the compressed mask look-up index.

As a mask is being looked-up in memory, a color look-up for the colors C0 and C1 is performed using the variance color look-up table, if required. C0 and C1 are 0-extended to a full six bits before searching the variance color look-up table 610. The 6-bit input to the variance color look-up table 610 is selected by a selector 612, which in accordance with an exemplary embodiment corresponds to the multiplexers and row and column counters of FIG. 9.

Figure 9:
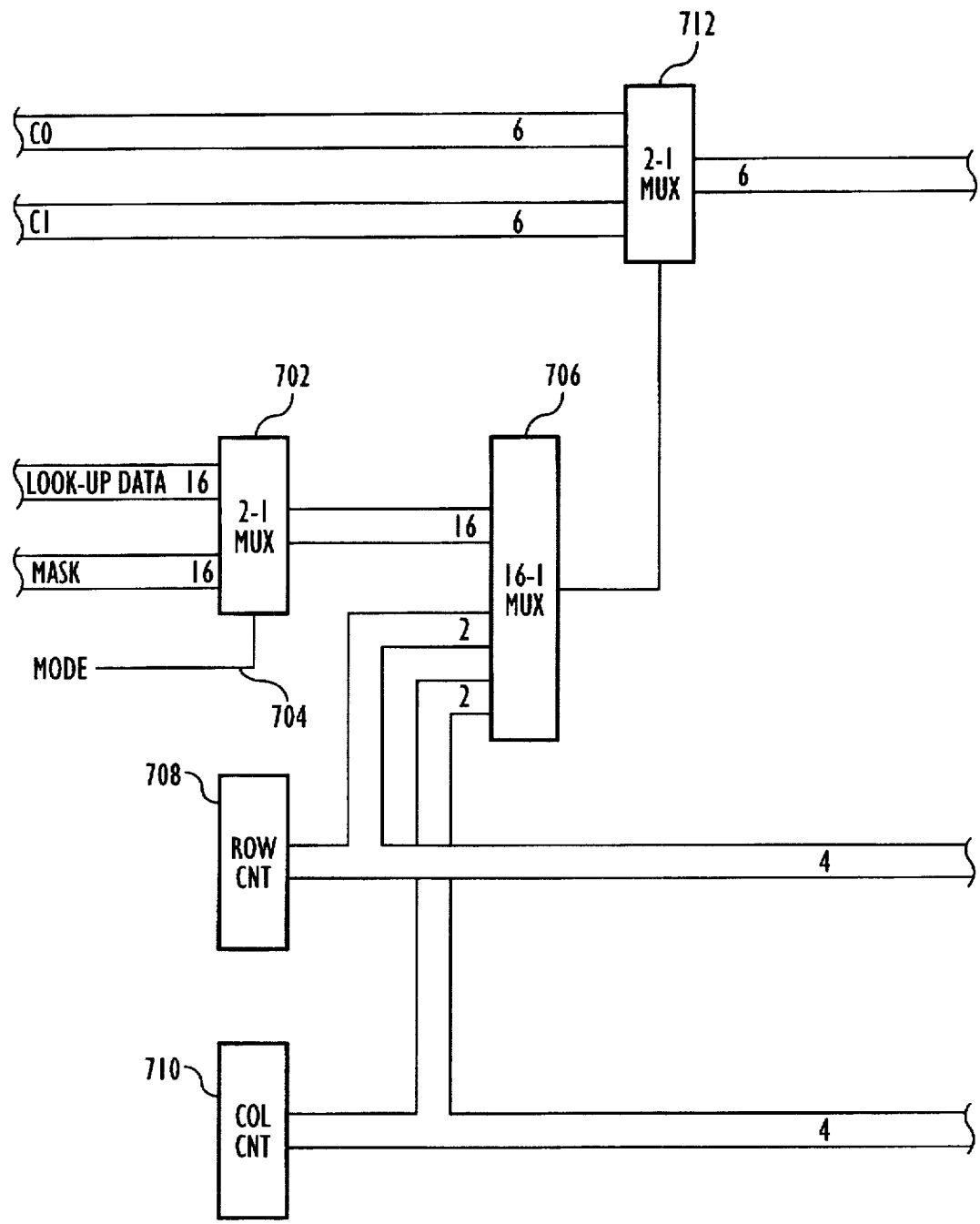
FIG. 9 illustrates an exemplary embodiment of a selector included within the FIG. 8 hardware.

Referring to FIG. 9, a 2-to-1 multiplexer 702 receives both a non-compressed 16-bit mask from the compressed data block, or a 16-bit output from the mask look-up table. A mode select input 704 to the multiplexer 702 identifies whether a compressed mask has been used so that the appropriate input to the multiplexer 702 can be selected and output to a 16-to-1 multiplexer 706. The output from the multiplexer 706 is selected by the bits from the row and column counters used to identify a given row and column in a partitioned block of pixels. The row and column counters are labelled counters 708 and 710 in FIG. 9, respectively. The output from the multiplexer 706 corresponds to a single pixel within a partitioned block of pixels, and identifies whether the color associated with the pixel is C0 or C1.

The output from the multiplexer 706 is used as a select input to a 2-to-1 multiplexer 712 for selecting either the 6-bit index for identifying the color C0 or the 6-bit index for identifying the color C1. The selected 6-bit output from the multiplexer 712 is used as a look-up address for the variance color look-up table 610 of FIG. 6, and thereby produces a 32-bit color output corresponding to the decompressed color C0 or C1.

The 32-bit output from the variance color look-up table is supplied to a multiplexer 614. The multiplexer 614 also receives a 32-bit input directly from the field extraction unit to accommodate decompressed data blocks of the non-variance type. A select line 616 to the multiplexer 614 corresponds to the select bit which identifies whether the partitioned block of pixels is of the variance type or the non-variance type. Depending on the binary state of this select bit, either the 32-bit data output directly from the field extraction unit 606 is selected or, in the case of a variance type block, a 32-bit output from the variance color look-up table 610 is selected. This process is repeated for each pixel of a partitioned block.

FIG. 8 also illustrates the supply of address and data information to each of the look-up table 608, the variance color table 610, a threshold matrix 622 and a video modulation look-up table 622. Such address and data lines are used to store data in these tables and to read data therefrom during testing, if desired. Aspects of features provided in the exemplary FIG. 8 embodiment such as grey component removal 618, threshold matrix 620 and video modulation look-up table are not necessary to understanding the present invention. For more detail regarding exemplary embodiments of these features, as well as a more detailed discussion of operation of the FIG. 8 embodiment, reference is made to the aforementioned commonly assigned U.S. application Ser. No. 08/397,372.

c. CDC Dynamic Band Recompression

In accordance with the present invention, the color fidelity of a decompressed image produced from the compressed frame of image data can be significantly enhanced by iteratively decompressing at least a portion of the frame of image data during the compression process. For example, compression of a frame of image data can be performed using dynamic color matching and dynamic mask compression as described previously. Recall that each of these techniques involve the dynamic updating of a look-up table that can overflow if its limits are exceeded during the compression process. Each time one or more of these tables overflows, the frame of image data can be reprocessed to create a reduced set of entries for the table which overflowed. Such a building up of a look-up table prior to compression of the frame of input image data is described in commonly assigned copending U.S. application Ser. No. 08/462,619, filed Jun. 5, 1995 (Attorney Docket No. P1572/239) entitled "METHOD AND APPARATUS FOR ENCODING COLOR IMAGE DATA USING DYNAMIC MASK COMPRESSION", and U.S. application Ser. No. 08/463,782, filed Jun. 5, 1995 (Attorney Docket No. P1569/240) entitled "METHOD AND APPARATUS FOR ENCODING COLOR IMAGE DATA USING DYNAMIC COLOR MATCHING" the contents of which are hereby incorporated by reference in their entireties.

In contrast, exemplary embodiments of the present invention are directed to handling such an overflow condition using an iterative decoding (for example, decompression) of the image data during the encoding (for example, compression) process. That is, portions of compressed image data are dynamically decompressed, prior to compressing remaining portions of image data included in the frame of image data, in response to a predetermined condition such as overflow of the color value look-up table or the dynamically updated mask look-up table. As a result, more efficient encoding of image data can be achieved as the look-up tables used for the encoding process are being built-up.

Figure 11A:
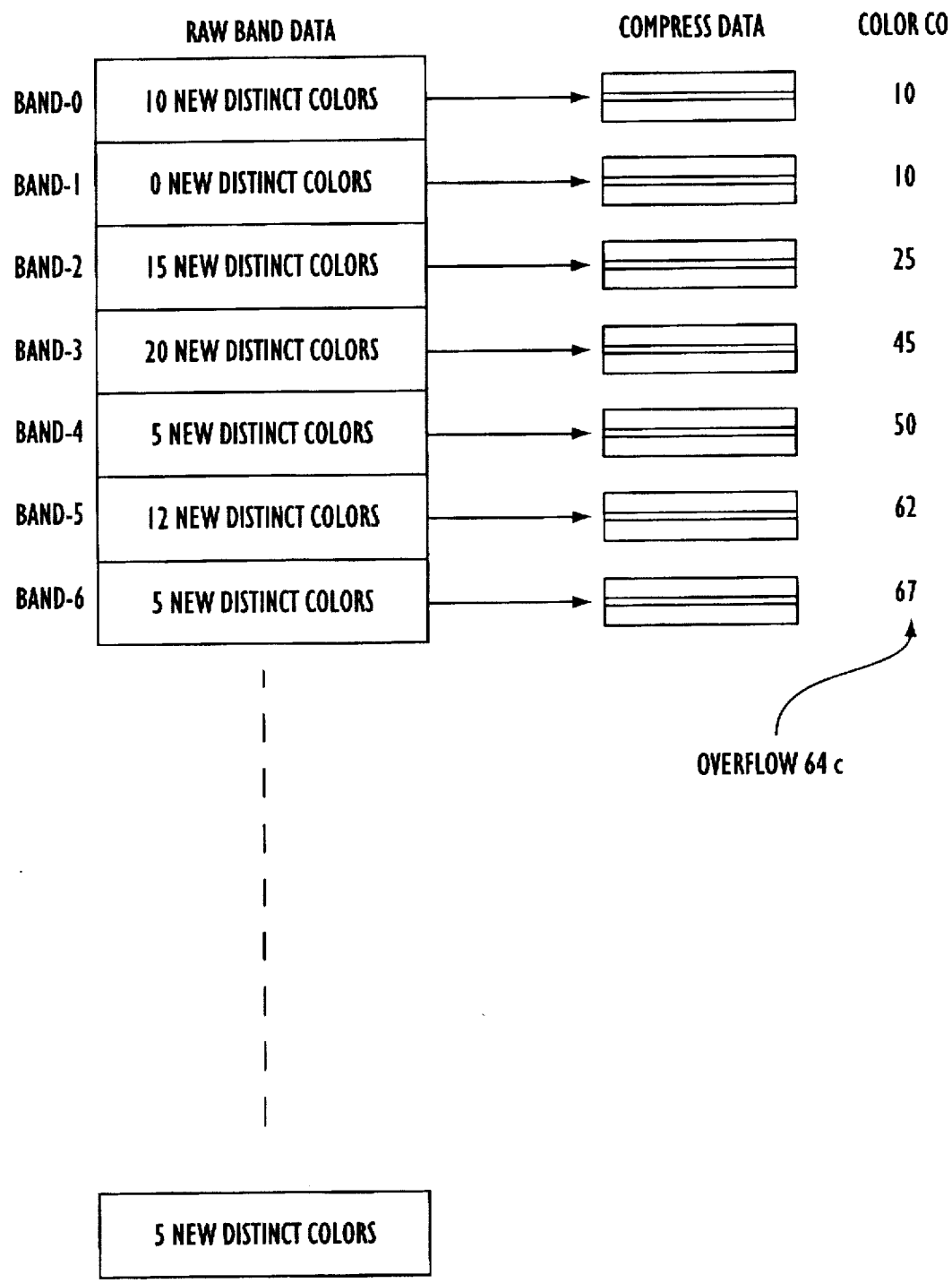
FIGS. 11a and 11b illustrate an exemplary compression/decompression operation using dynamic band recompression.

For example, referring to FIG. 11a, a frame of raw image data is illustrated which is being processed (e.g., compressed) in bands. Recall that the frame of image data is divided into a plurality of bands so that the entire frame of image data need not be stored in the FIG. 1 system at any given time; rather, a band of raw data is received, processed and compressed such that the entire frame of image data is only stored in the FIG. 1 system in its compressed form. Because the frame of input image data is not stored at any one time in the FIG. 1 system, a problem can arise if either the color value look-up table used for dynamic color matching or the mask index look-up table used for mask compression overflow during the compression process.

When an overflow condition occurs in one of these tables, values stored in these tables and used to compress the input image data may no longer be valid. That is, the updated values stored in these tables cannot be used to decompress input image data which was compressed with the original values stored in the tables. Because the original frame of input image data is not available for compression with the new values stored in these dynamically updated tables, exemplary embodiments of the present invention are directed to decompressing any portions of the frame of image data which were previously compressed.

Those skilled in the art will appreciate that if no overflow conditions occur, then all portions of the input image data which have been compressed using the color and mask index values stored in these respective tables can be decompressed with the values stored in these tables. It is only when the values stored in these tables have been updated due to dynamic color matching or dynamic mask compression that an iterative, dynamic decompression in accordance with exemplary embodiments of the present invention is used.

To illustrate the dynamic decompression and subsequent recompression during a compression process, consider the 64 entry color value look-up table described previously with respect to dynamic color matching. Further, with respect to FIG. 11a, consider a frame of image data which has been divided into 100 bands, each of which includes any number of partitioned blocks of pixels. If during initial compression of the input image data, using band-by-band compression, the color value look-up table overflows, a decompression of those bands is performed.

In the FIG. 11a example, each of the first five bands was compressed, with color values associated with pixels determined to be color variant being stored in the color value look-up table. Processing of bands 1–5 of input image data does not result in the detection of any more than 64 color values, such that no overflow condition of this look-up table occurs.

Referring to FIG. 11a, 10 new color values were identified for color variant partitioned blocks in band 0, no new colors were identified for color variant partitioned blocks in band 1, 15 new color values were identified for color variant partitioned blocks in band 2, 20 new color values were identified for color variant partitioned blocks in band 3, 5 new color values were identified for color variant partitioned blocks in band 4, and 12 new color values were identified for color variant partitioned blocks in band 5. Thus, the total color values identified for color variant partitioned blocks in bands 0–5 was 62 and no decompression of the input image data was necessary up to this point.

However, as band 6 of the input image data is being compressed, 5 new color values for pixels of color variant partitioned blocks are identified, thereby causing overflow of the color value look-up table. Once this overflow is detected, dynamic band decompression is used to address the overflow of the color value look-up table. As described previously, dynamic color matching can result in new entries being stored in the color value look-up table. However, because bands 0–5 were encoded with the original values stored in the color value look-up table, this information must be re-encoded with the new color values stored in the color value look-up table.

Exemplary embodiments of the present invention perform a decompression of bands 0–5 using the original values stored in the color value look-up table. These bands are then recompressed using color values stored in the dynamically updated color value look-up table.

Assuming that no further overflow conditions occur in the color value look-up table, all of bands 0–99 are compressed using this dynamically updated color value look-up table. All such compressed image data can then be decompressed using the color values stored in the color value look-up table. However, if during the processing of a subsequent band (e.g., band 50) another overflow condition of the color value look-up table occurs, then an iterative decompression of all previously compressed color image data is necessary using the original color value look-up table, followed by a recompression of this image data using the dynamically updated color value look-up table.

Figure 11B:

Recall that in accordance with an exemplary discussion of the dynamic updating of the color value look-up table, a 9-bit color value is reduced to an 8-bit color value, to thereby reduce the number of possible color values from 512 to 256. Thus, in accordance with exemplary embodiments of the present invention, a decompression of all of the image data previously compressed using the 9-bit values must be decompressed using the 9-bit values and then recompressed using the 8-bit values. Such a decompression/recompression iteration is illustrated in FIG. 11b.

In summary, once a predetermined condition such as an overflow of the color value look-up table occurs, compressed bands which have been previously stored must be decompressed. In the above example, the predetermined condition was an overflow of the color value look-up table which resulted in a collapsing of the color values included in the original image data for color variant partitioned blocks to a reduced color palette. However, those skilled in the art will appreciate that a similar decompression/recompression technique can be used in response to an overflow condition of the mask compression look-up table which results in a mask collapsing.

Alternately, any other predetermined condition specified by the user can be used to initiate the decompression/recompression technique in accordance with exemplary embodiments. For example, any condition which occurs during the compression process and which results in the storing of invalid compressed values, can be used to trigger, or initiate, the dynamic decompression/recompression.

Those skilled in the art will further appreciate that the use of a dynamic recompression in accordance with exemplary embodiments of the present invention occurs within the compression domain and is therefore transparent to remaining portions of the FIG. 1 system. Accordingly, exemplary embodiments of the present invention can use a compression process to retouch any compressed data, if specified by the user, or trigger any response to some predetermined condition, without affecting operation in remaining portions of the FIG. 1 system.

Further, exemplary embodiments can achieve enhanced color fidelity of image data which is decompressed from the compressed image data without significantly affecting real time processing. In particular, if none of the predetermined conditions specified by the user occur during the compression process, the entire compression process occurs without any dynamic decompression/recompression. Multiple iterations are only performed where a predetermined condition is detected during the compression process.

6. Video Interfacing Device

The video interface device can be used for decompressing data such that it can be output to, for example, a display or printer. Features included in the video interface device for decompressing the image data duplicate features included within the decompression engine of the compression/decompression coprocessor 108. Any additional features of the video interface device which do not duplicate structure and function of the compression/decompression coprocessor are outside the scope of the present invention and need not be described in detail. Rather attention is directed to the aforementioned commonly assigned U.S. application Ser. No. 08/397,372 for a more detailed discussion of an exemplary video interface device suitable for use with the exemplary embodiments of the present invention.

While the foregoing has set forth exemplary embodiments of the present invention, those skilled in the art will appreciate that these examples are by way of illustration only. For example, while exemplary embodiments have been described in connection with data compression with respect to pixmaps used in connection with printing, those skilled in the art will appreciate that techniques of the present invention are also suitable for the reduction of information transmitted between computers, or between a computer and an input device such as a scanner, or between a computer and an output device (such as a printer).

Further, those skilled in the art will appreciate that the partitioned blocks described above can be of any dimension. Further, the partitioning can be adaptive and dynamic, even within a given frame of image data, with the only requirement being that dimensional information be made known to the decompression process.

Exact dimensions of compressed and decompressed data blocks can also be modified as desired by the user, and the 29-bit value for compressed data blocks is by way of example only. Further, the compressed data and decompressed data block size need not remain fixed, but could be varied from block-to-block. Encoded variant and invariant block sizes can also be different from one another.

In addition, those skilled in the art will appreciate that a fixed color palette need not be used. Rather, the color palette can be dynamically assigned as long as the update information is part of the compressed data storage or stream.

Although variant blocks as described in the exemplary embodiment above are encoded as a 1-bit mask with two sub-palettes of a larger color palette, those skilled in the art will appreciate that masks of any size can be used. For example, a mask of 3-bits for each pixel can be used, with each 3-bits pointing to a palette or sub-palette of eight color values.

Those skilled in the art will further appreciate that invariant blocks need not correspond to blocks where all pixels have the same value. Rather, blocks with pixels that fall within an acceptable range can be mapped into an invariant color block, using a value that represents the entire block, with no visible degradation.

In accordance with alternate embodiments, those skilled in the art will appreciate that the variant and non-variant select indicator bit for each block need not be specifically encoded. For example, if a large area of the pixmap is non-variant, then the selector bit can be further compressed. For example, the selector bit can be encoded in run length fashion.

Further, known compression techniques can be used in conjunction with the compression techniques of the present invention. For example, two successive non-variant blocks can be encoded using a repeat flag, without having to encode the full information for the second and successive blocks. Further, where successive non-variant blocks differ only slightly from a preceding non-variant block, the known compression technique of delta modulation can be used to further compress the data. This use of such known compression techniques in accordance with the present invention is by way of illustration only, and any number of known compression techniques can be used in accordance with the present invention to improve compression.

Further, while compression has been described with respect to all components of a given pixel at one time, those skilled in the art will appreciate that the color components can be compressed separately.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for compressing a frame of image data comprising the steps of:

processing a portion of the frame of image data;

encoding image data included in said portion of the frame of image data; and dynamically decoding portions of said encoded image data, prior to encoding the entire frame of image data, in response to a predetermined condition.

2. A method according to claim 1, further including the step of:

dividing said frame of image data into a plurality of bands of image data.

3. A method according to claim 1, wherein said frame of image data includes a plurality of pixels, each of which is represented by a color value.

4. A method according to claim 3, wherein the color of each pixel in said frame of image data is represented using C,M,Y,K color components.

5. A method according to claim 3, wherein a color of each pixel in said frame of image data is represented as a value having a variable grey scale level.

6. A method according to claim 3, wherein a color value of each pixel in said frame of image data is represented with at least 32-bits in uncompressed form.

7. A method according to claim 3, further including the step of:

dividing said frame of image data into a plurality of bands of image data, wherein each band includes a plurality of partitioned blocks, and each partitioned block includes a predetermined number of pixels from said frame of image data.

8. A method according to claim 7, wherein said partitioned blocks are tiled in non-overlapping fashion.

9. A method according to claim 7, wherein said step of encoding further includes a step of:

distinguishing partitioned blocks wherein pixels are color variant from partitioned blocks wherein pixels are color invariant, and encoding partitioned blocks which are color variant using a mask having a plurality of bits, each bit corresponding to a pixel location of said partitioned block.

10. A method of compressing a frame of image data, comprising the steps of:

processing a portion of the frame of image data wherein said frame of image data includes a plurality of pixels, each of which is represented by a color value, and wherein said frame of image data is divided into a plurality of bands of image data, each band including a plurality of partitioned blocks, each partitioned block including a predetermined number of pixels from said frame of image data;

encoding image data included in said portion of the frame of image data by encoding at least some of said partitioned blocks with a mask index to a look-up table during compression of said frame of image data, storing a plurality of geometrical patterns in said look-up table which are defined by different color values for pixels included in each partitioned block, and dynamically updating said plurality of geometrical patterns stored in said look-up table; and dynamically decoding portions of said encoded image data, prior to encoding the entire frame of image data, in response to a predetermined condition.

11. A method according to claim 10, wherein said step of dynamically decoding further includes the step of:

initiating said dynamic decoding when the number of geometrical patterns detected in said frame of image data exceeds a predetermined number.

12. A method of compressing a frame of image data, comprising the steps of:

processing a portion of the frame of image data, wherein said frame of image data includes a plurality of pixels, each of which is represented by a color value;

encoding image data included in said portion of the frame of image data by representing each detected color in said frame of image data with a color index value to a color value look-up table during compression of said frame of image data, storing a plurality of color values in said color value look-up table during said step of encoding, wherein each of said stored color values corresponds to one of said detected colors in said frame of image data, and dynamically updating said plurality of color values stored in said color value look-up table when a number of colors detected in said frame of image data exceeds a predetermined number; and dynamically decoding portions of said encoded image data prior to encoding the entire frame of image data, in response to a predetermined condition.

13. A method according to claim 12, wherein said step of dynamically decoding further includes a step of:

initiating said dynamic decoding when the number of colors detected in said frame of image data exceeds said predetermined number.

14. A method according to claim 1, wherein said step of dynamically decoding further includes the step of:

iteratively performing said step of dynamic decoding and a recompression of said frame of image data until the entire frame of image data has been processed.

15. A method according to claim 12, wherein said step of dynamically decoding further includes the step of:

iteratively performing said step of dynamic decoding and a recompression of said frame of image data until the entire frame of image data has been processed.

16. A method according to claim 10, wherein said step of encoding further includes the steps of:

representing each detected color in said frame of image data with a color index value to a color value look-up table during compression of said frame of image data;

storing a plurality of color values in said color value look-up table during said step of encoding, wherein each of said stored color values correspond to one of said detected colors in said frame of image data; and dynamically updating said plurality of color values stored in said color value look-up table when a number of colors detected in said frame of image data exceeds a predetermined number.

17. A method according to claim 16, wherein said step of dynamically decoding further includes the step of:

iteratively performing said step of dynamic decoding and a recompression of said frame of image data until the entire frame of image data has been processed.

18. Apparatus for compressing a frame of image data comprising:

a processor for separating a frame of image data into a plurality of bands;

a band buffer for storing a band of said frame of image data; and a processor for encoding image data included in said band of image data, and for dynamically decoding said band of encoded image data, prior to encoding the entire frame of image data, in response to a predetermined condition.

* * * * *